United States Patent [19]

Fournier et al.

[11] Patent Number: 5,165,355

[45] Date of Patent: Nov. 24, 1992

[54] METHOD AND APPARATUS FOR HANDLING HOSIERY BLANKS

[75] Inventors: Claude Fournier; Patrick Hauguet; Robert Burguiere; Jean-Pierre Peauger, all of Autun, France; J. Reid London, Winston-Salem; Arthur W. Parris, Jr., Rockingham, both of N.C.; Charles E. Helms, Florence, S.C.; Robert L. Stewart, Rockingham, N.C.

[73] Assignee: Sara Lee Corporation, Winston-Salem, N.C.

[21] Appl. No.: 675,498

[22] Filed: Mar. 26, 1991

[51] Int. Cl.$^5$ .............................................. D05B 33/00
[52] U.S. Cl. ............................. 112/262.2; 112/262.3; 112/121.15; 112/155; 223/43
[58] Field of Search ................ 112/121.15, 121.12, 112/306, 303, 121.11, 262.2, 262.3, 2, 155; 223/43, 75, 112

[56] References Cited

U.S. PATENT DOCUMENTS

| Re. 304,410 | 10/1980 | Povlacs | 406/87 |
|---|---|---|---|
| 4,188,898 | 2/1980 | Bell, Jr. et al. | 112/262.1 |
| 4,444,140 | 4/1984 | Moyer | 112/262.2 |
| 4,538,534 | 9/1985 | Frazier et al. | 112/262.2 |
| 4,539,924 | 9/1985 | Bell, Jr. et al. | 112/262.2 |
| 4,598,817 | 7/1986 | Bell, Jr. et al. | 198/468.2 |
| 4,620,494 | 11/1986 | Takatori et al. | 112/121.15 |
| 4,643,340 | 2/1987 | Bailey | 223/40 |
| 4,649,838 | 3/1987 | Gazzarrini | 112/121.75 |
| 4,784,070 | 1/1988 | Thurner et al. | 112/121.15 X |
| 5,040,475 | 8/1991 | Fournier et al. | 112/121.15 |

Primary Examiner—Peter Nerbun
Attorney, Agent, or Firm—Charles Y. Lackey; William S. Burden

[57] ABSTRACT

A system for automatically producing pantyhose garments from elongated tubular fabric blanks, each having a toe end portion and a welt or band end portion. Randomly oriented blanks are sequentially removed from a supply reservoir, oriented in a predetermined manner, and conveyed to a positioning and transferring assembly which orients, removes creases and pleats and properly positions a pair of blanks on the clamping assemblies of a pantyhose seaming machine. The pair of clamped blanks have the welt end portions severed, and severed edges seamed by sewing instrumentalities to define the panty portion of a pantyhose garment. The pantyhose are transferred to a machine where the toe ends are closed by seaming.

20 Claims, 18 Drawing Sheets

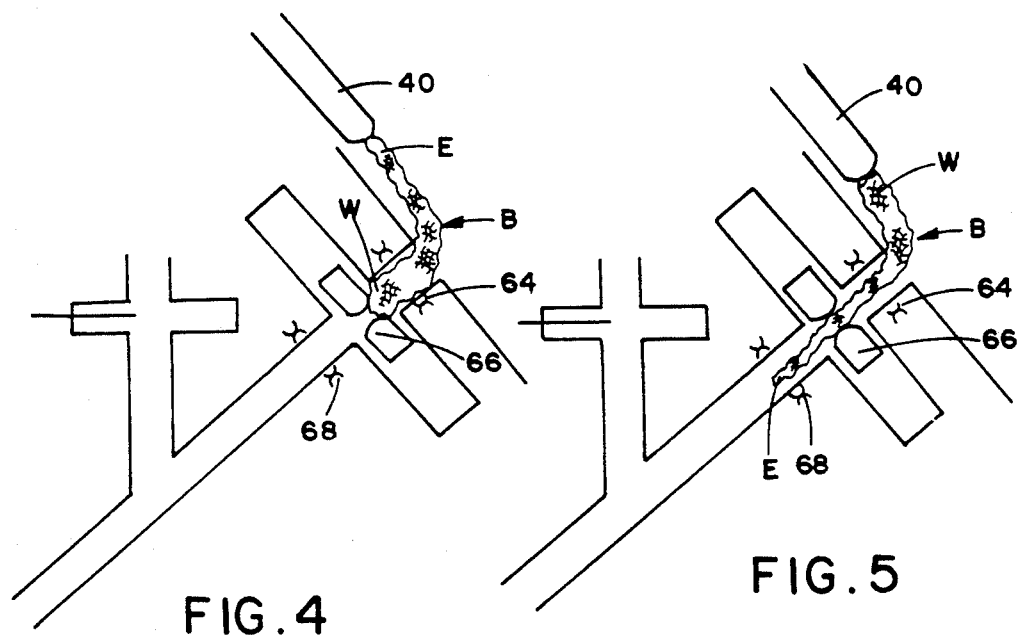
FIG. 4
FIG. 5
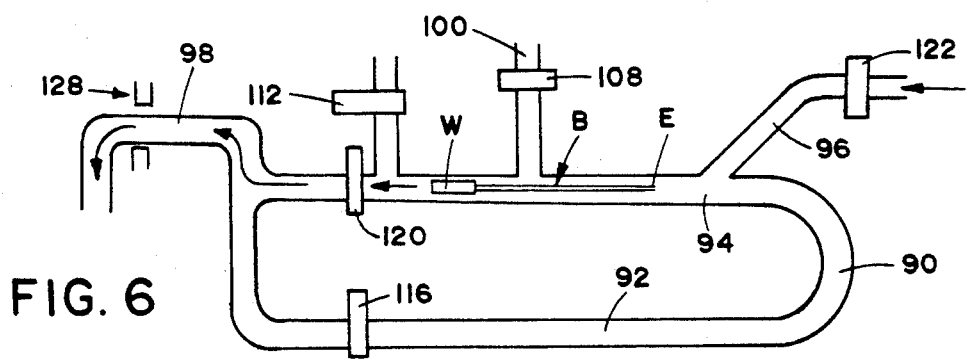
FIG. 6
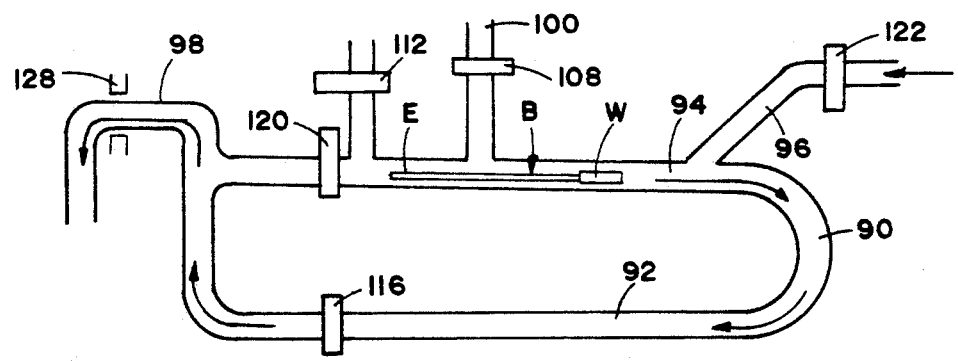
FIG. 7

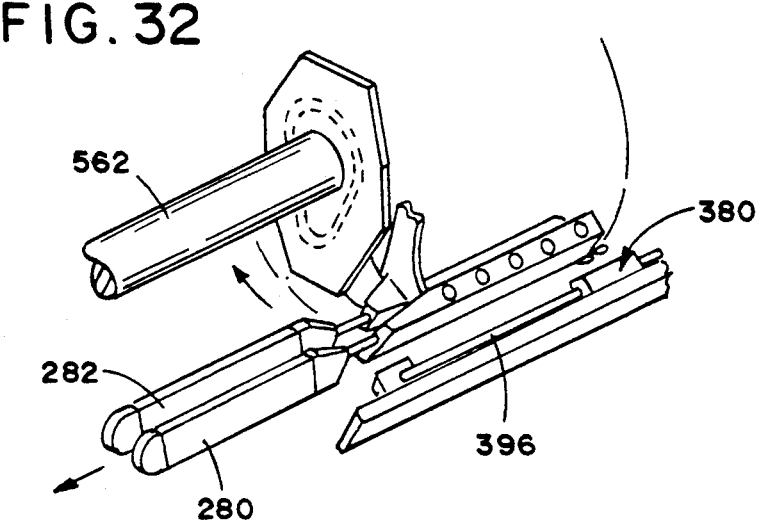
FIG. 32
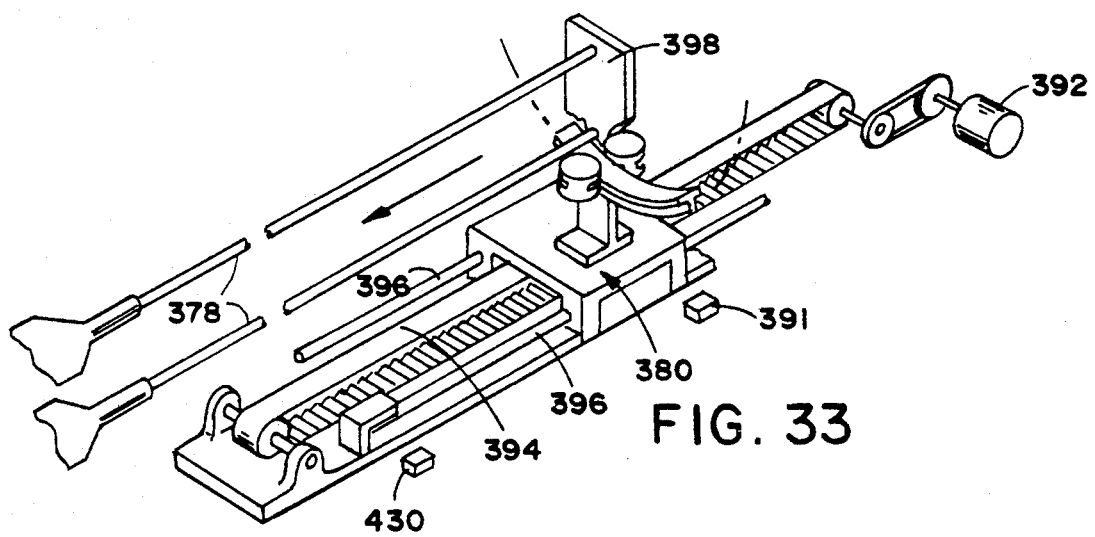
FIG. 37
FIG. 33

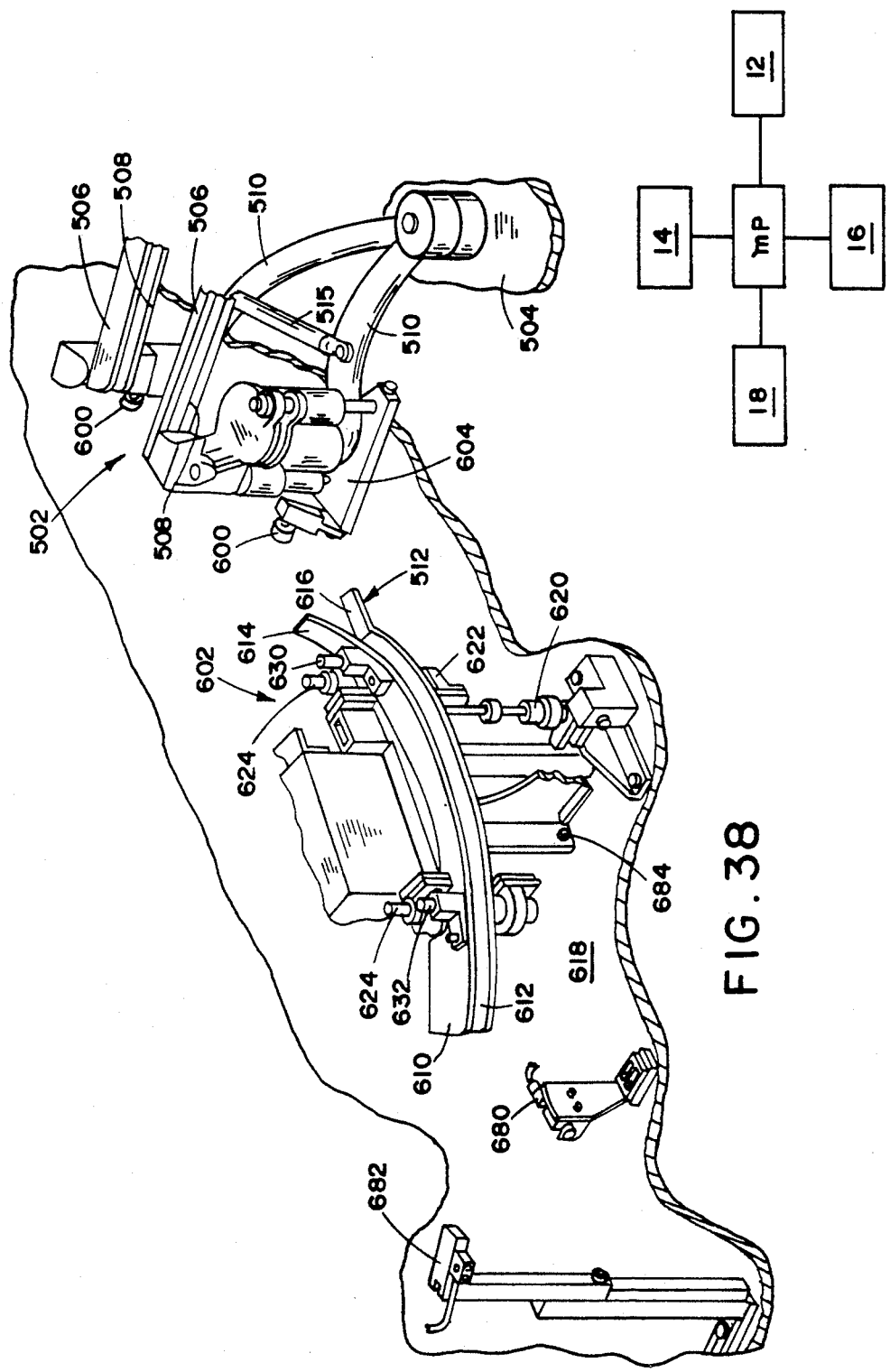

METHOD AND APPARATUS FOR HANDLING HOSIERY BLANKS

BACKGROUND, BRIEF SUMMARY, AND OBJECTS OF THE INVENTION

The present invention relates generally to the manufacture of pantyhose, and in particular to a new pantyhose automatic manufacturing system for removing hosiery blanks from a supply source, orienting the blanks in a predetermined manner, conveying the blanks to a positioning and transferring assembly which insures proper positioning of the blanks on the clamping assemblies of a pantyhose seaming machine, severing aligned hosiery blanks, inserting a gusset, and seaming the blanks to form the garment body portion, transferring the pantyhose to a toe closer machine, closing the toe portions and doffing the pantyhose garments therefrom.

Traditionally, pantyhose manufacturing involved knitting tubular blanks on a circular knitting machine, pairs of knit blanks are removed from a supply bin by an operator and positioned and aligned by the operator upon clamping assemblies of a line closing machine where they are partially slit and sewn to form the body portion of the pantyhose garment. A gusset may be inserted into the crotch of the garment if so desired. An operator then seams the toe portions closed or mounts the garment on a toe closing machine for subsequent seaming. Alternatively, the toe portions of the tubular blanks may be closed in a separate operation prior to placing the tubes upon the line closer.

In recent years, means have been developed for transferring hosiery articles between a line closer machine and a toe closer machine as taught, for example, in U.S. Pat. Nos. 4,550,868 and 4,620,494. However, a manual loading operation still is required.

In the present invention, the cost of producing pantyhose is substantially reduced since operator handling of the hosiery blanks or semi-finished pantyhose is eliminated.

According to the invention, knit tubular fabric blanks are automatically, sequentially, randomly retrieved from a reservoir or other supply source, oriented in a specified manner, conveyed to a positioning and transferring assembly for aligning, orienting and removing any pleats from the blanks before they are automatically transferred to clamping assemblies of a pantyhose seaming machine where the blanks are slit and sewn to define the body portion of a pantyhose garment. The sewn blanks subsequently are transferred to a machine where the blank toe portions are sewn closed.

The main object of the invention is the provision of a system for manufacturing a pantyhose garment from tubular knit blanks in a fully automatic manner without operator intervention.

Another object of the invention is the provision of a new and improved pantyhose producing system which increases production, reduces expense, and eliminates manual loading operations.

Still another object of the invention is an apparatus for automatically donning hosiery blanks on a pantyhose seaming machine in an aligned, oriented manner.

Further objects and advantages will appear from the following description of the invention explained by way of example only with reference to the accompanying drawings.

Figure 17:
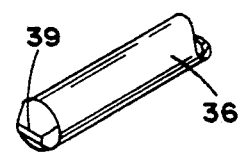
Figure 14:
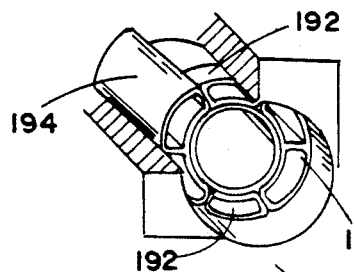
Figure 15:
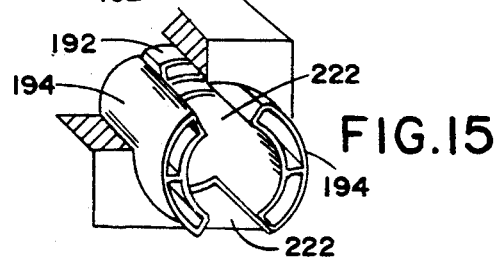
Figure 16:
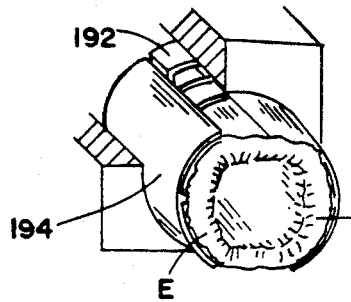
Figure 9:
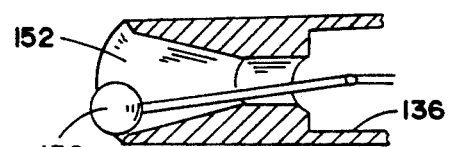
Figure 10:
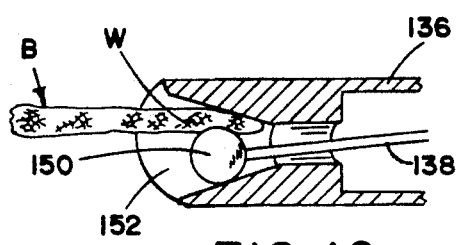
Figure 3:
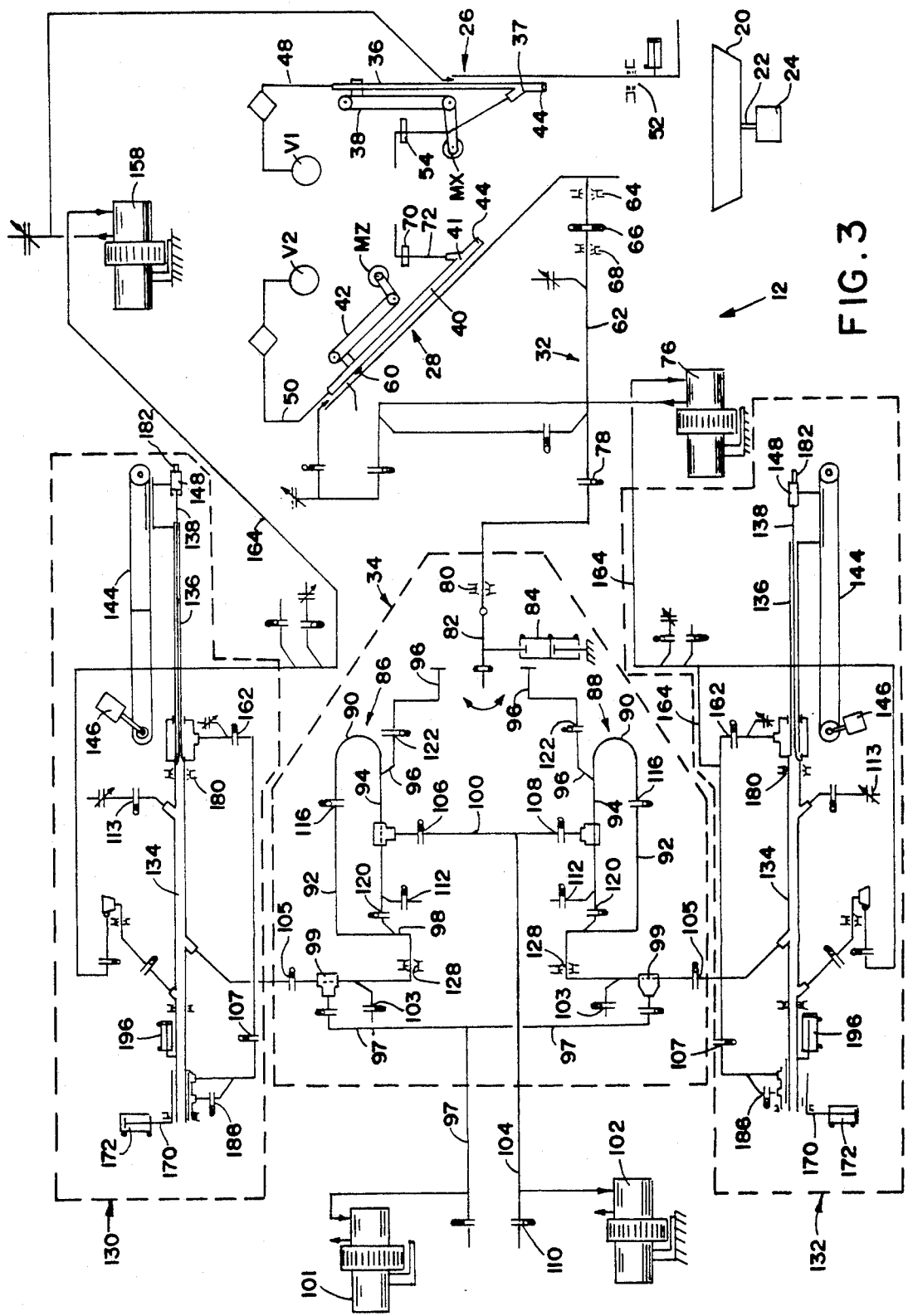
Figure 8:
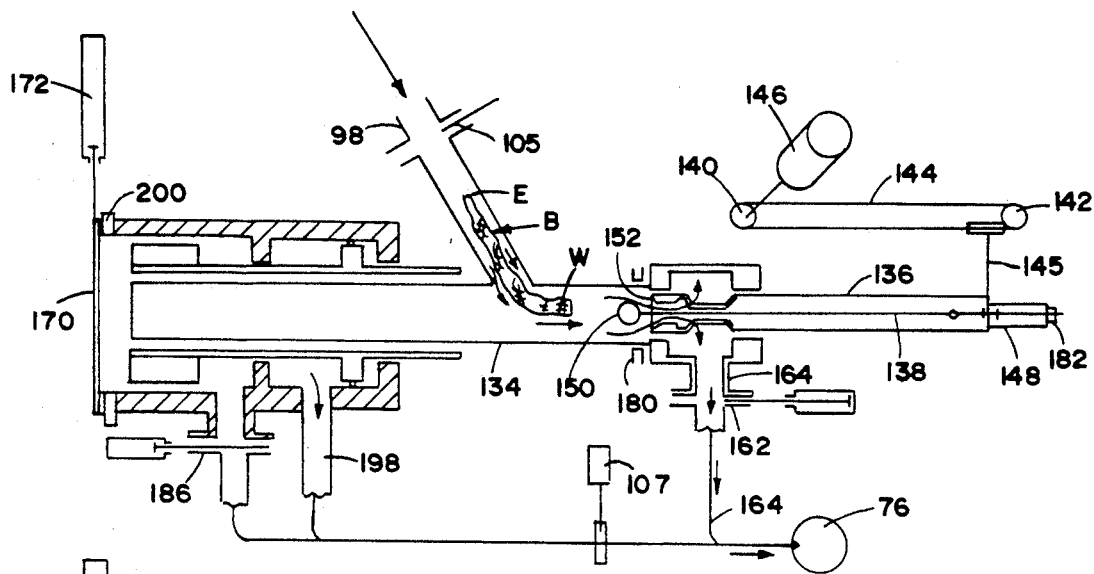
Figure 11:
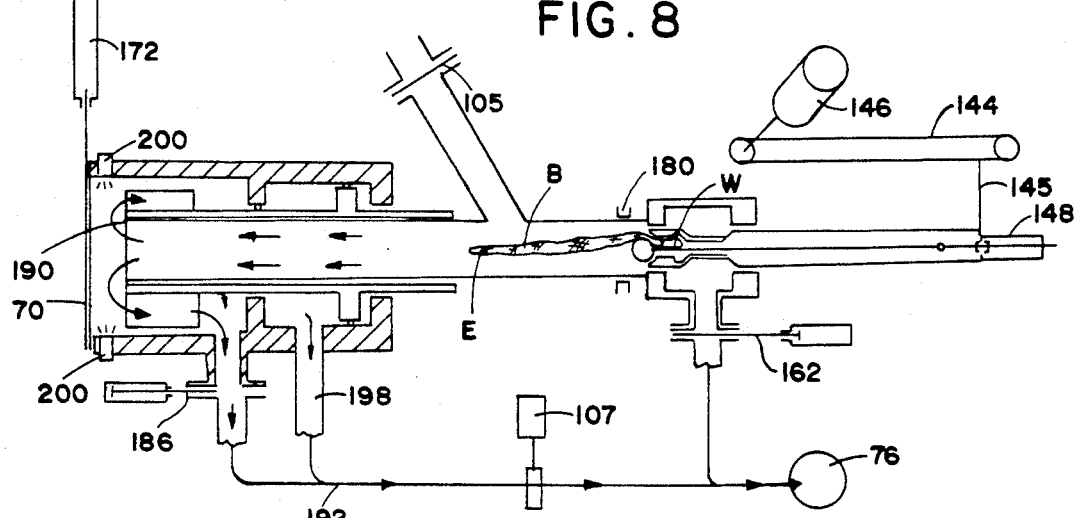
Figure 12:
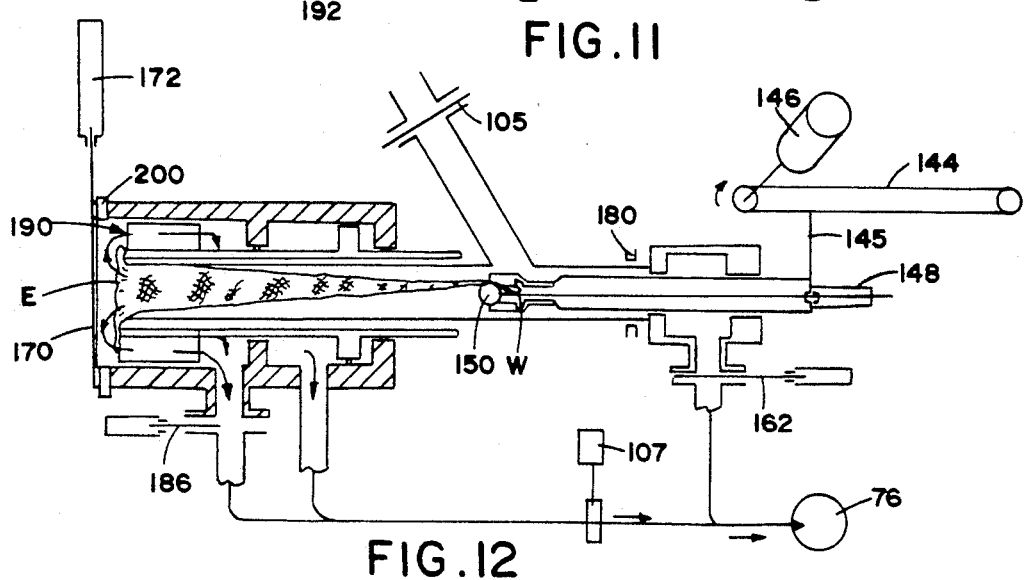
Figure 13:
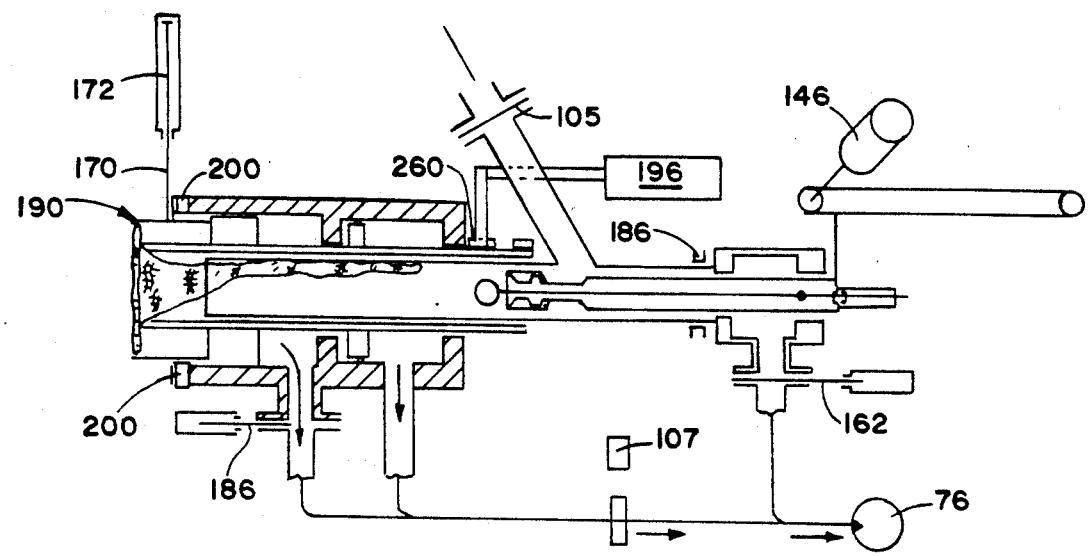
Figure 22:
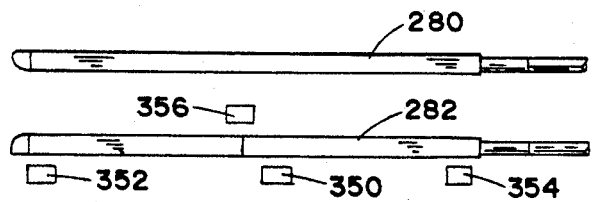
Figure 23:
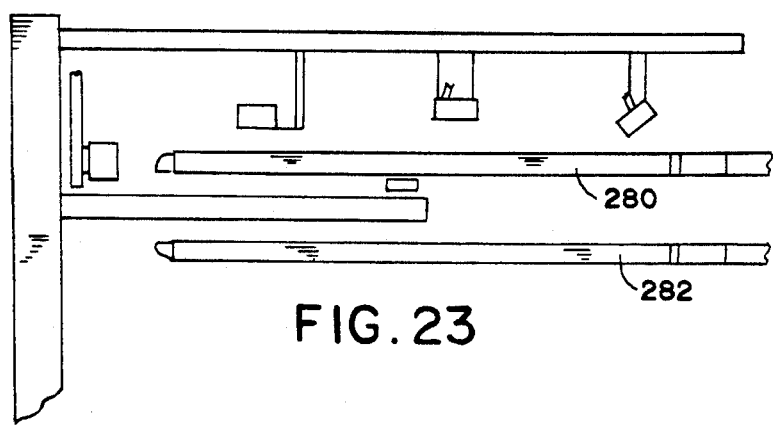
Figure 24:
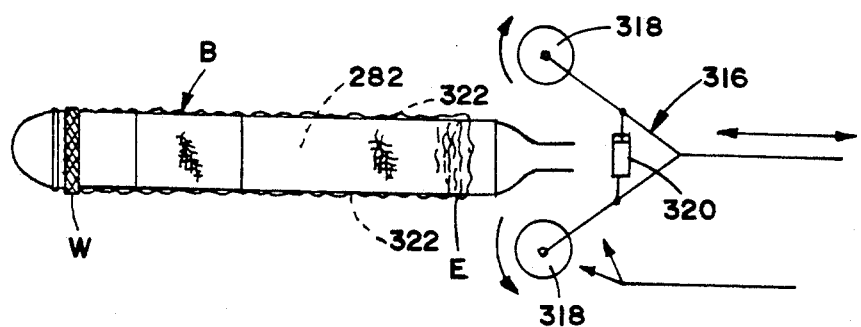
Figure 18:
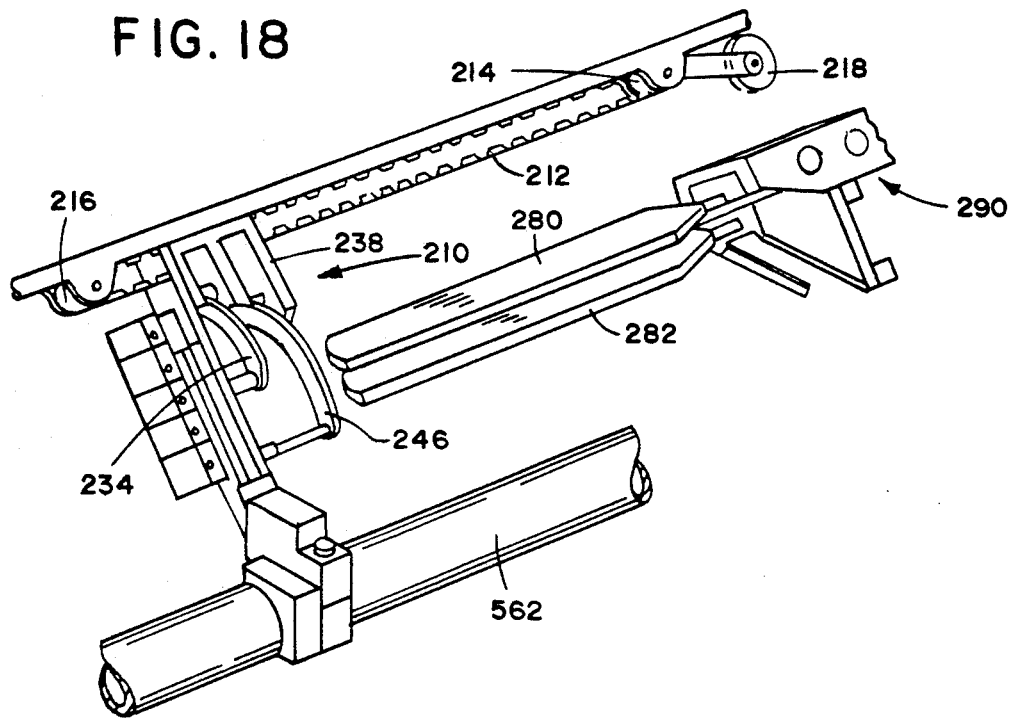
Figure 19:
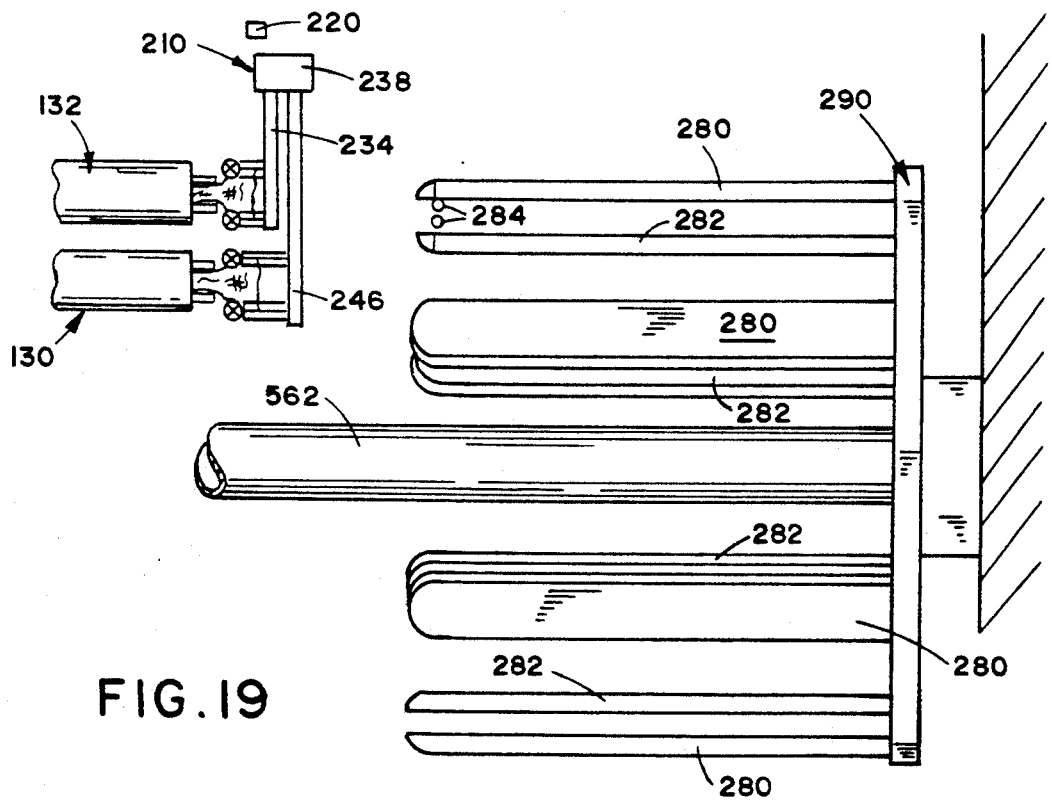
Figure 21:
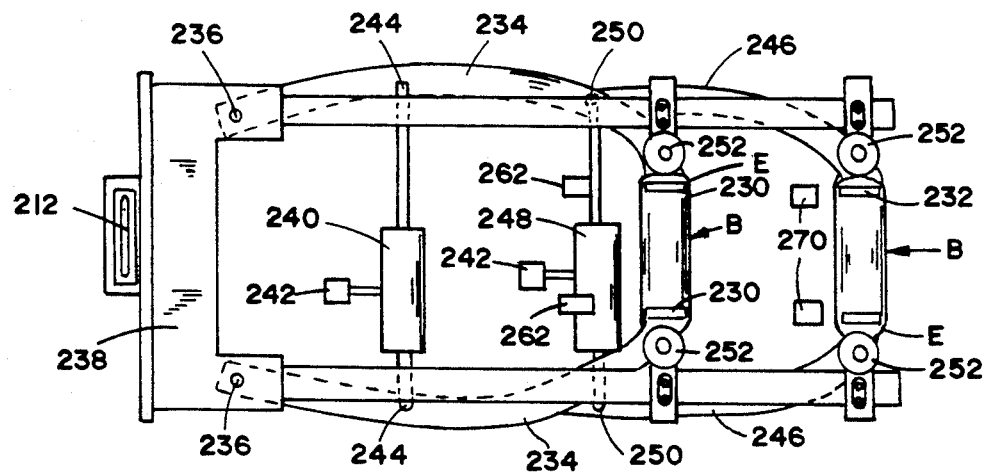
Figure 20:
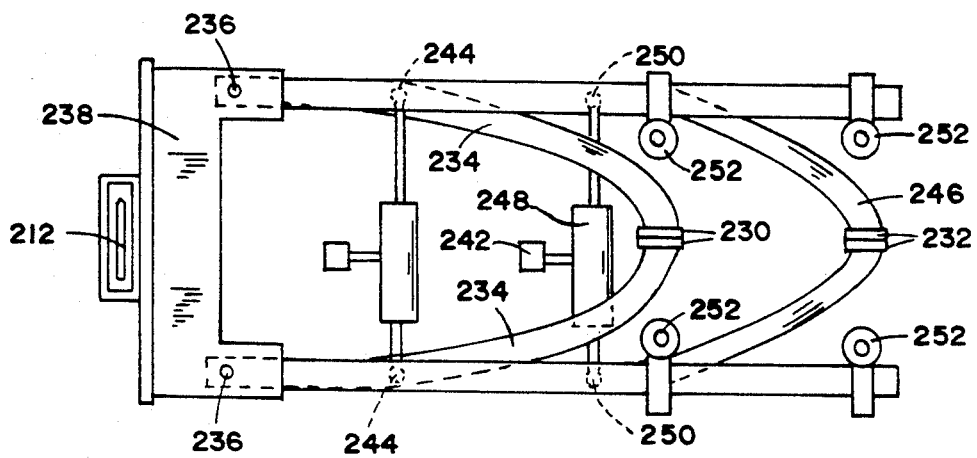
Figure 27:
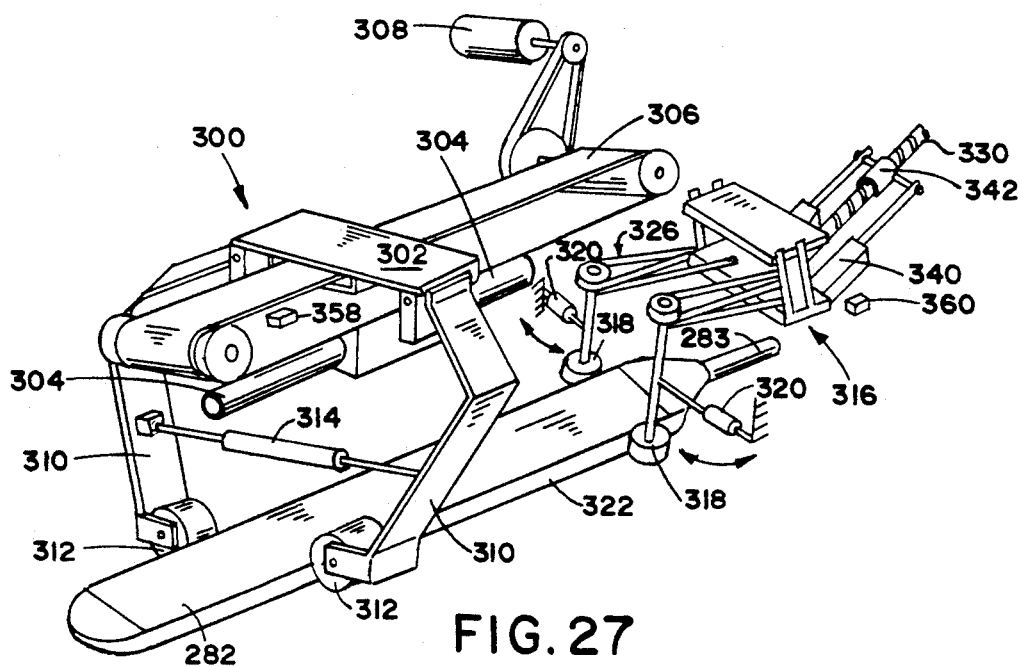
Figure 26:
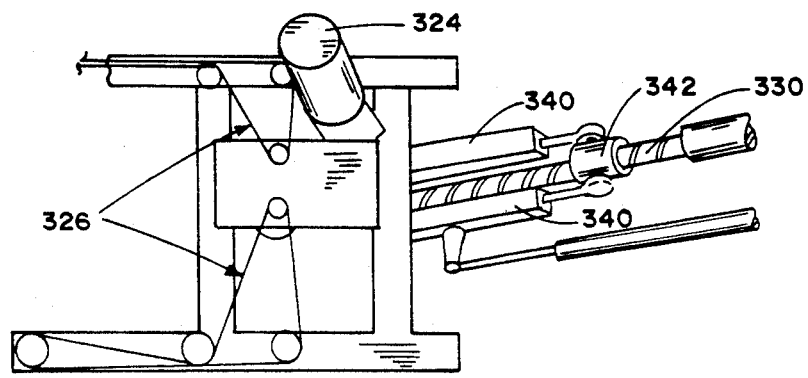
Figure 25:
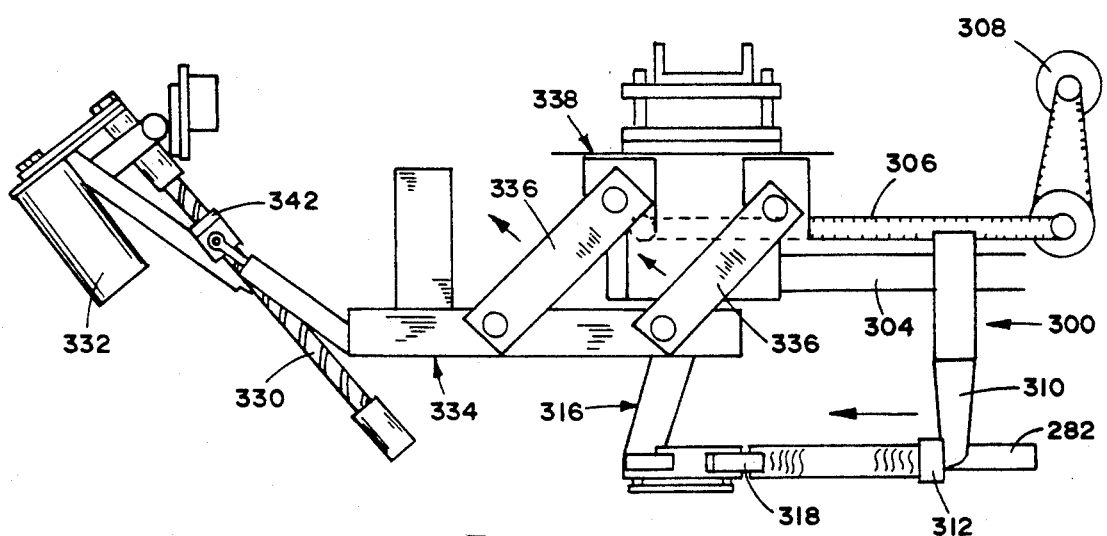
Figure 28:
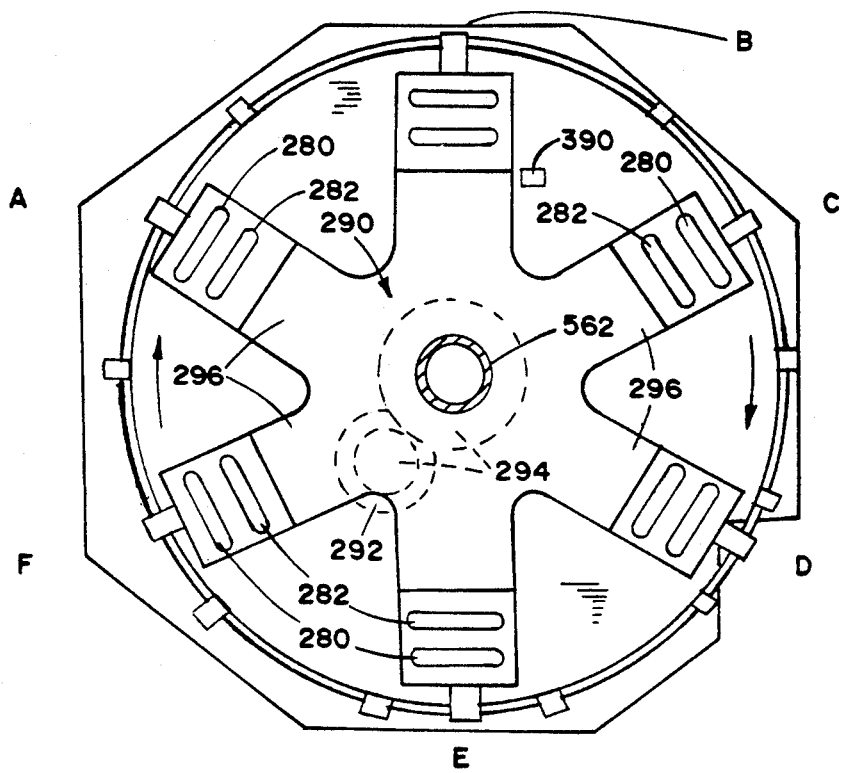
Figure 29:
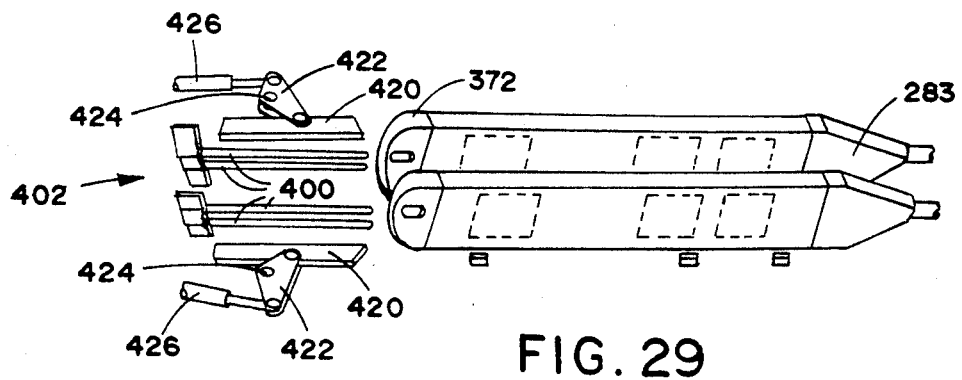
Figure 30:
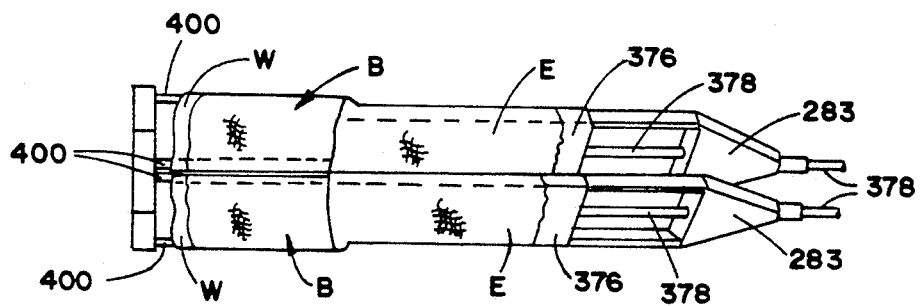
Figure 31:
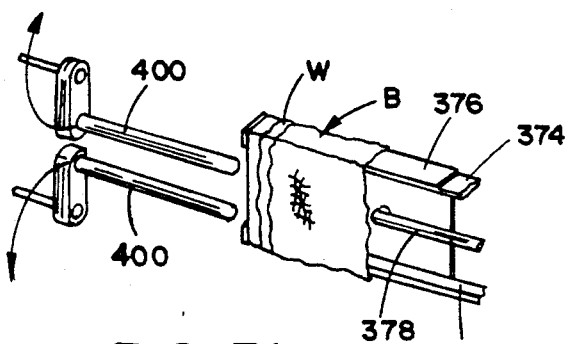
Figure 35:
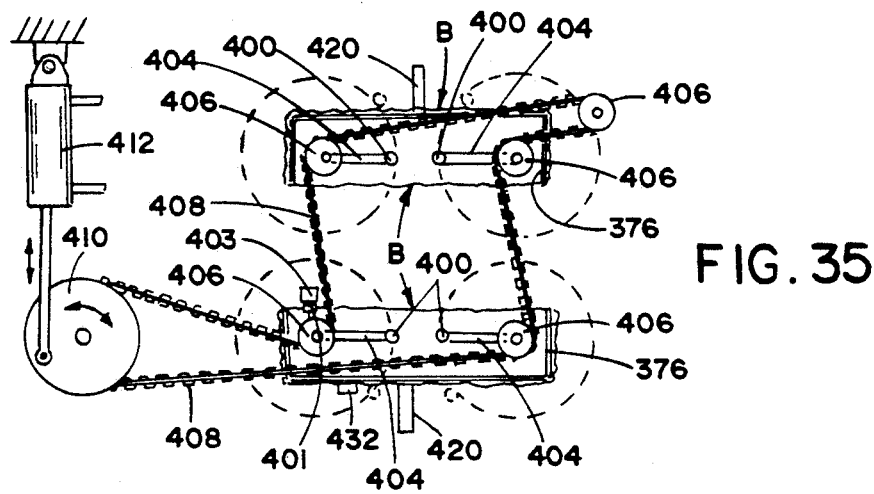
Figure 36:
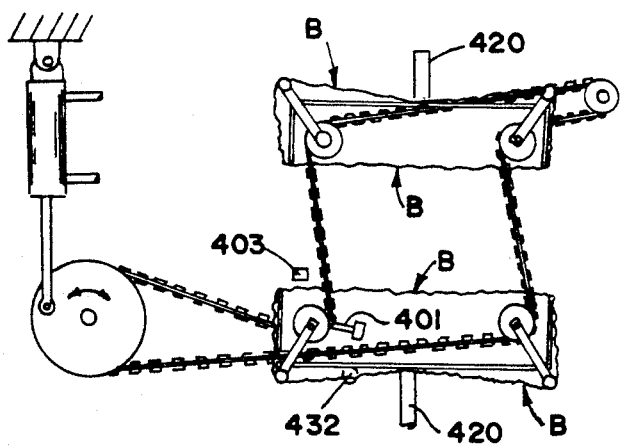
Figure 34:
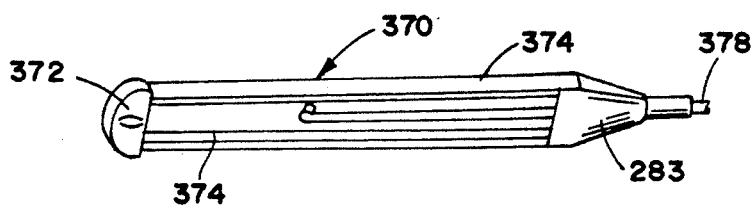
Figure 39:
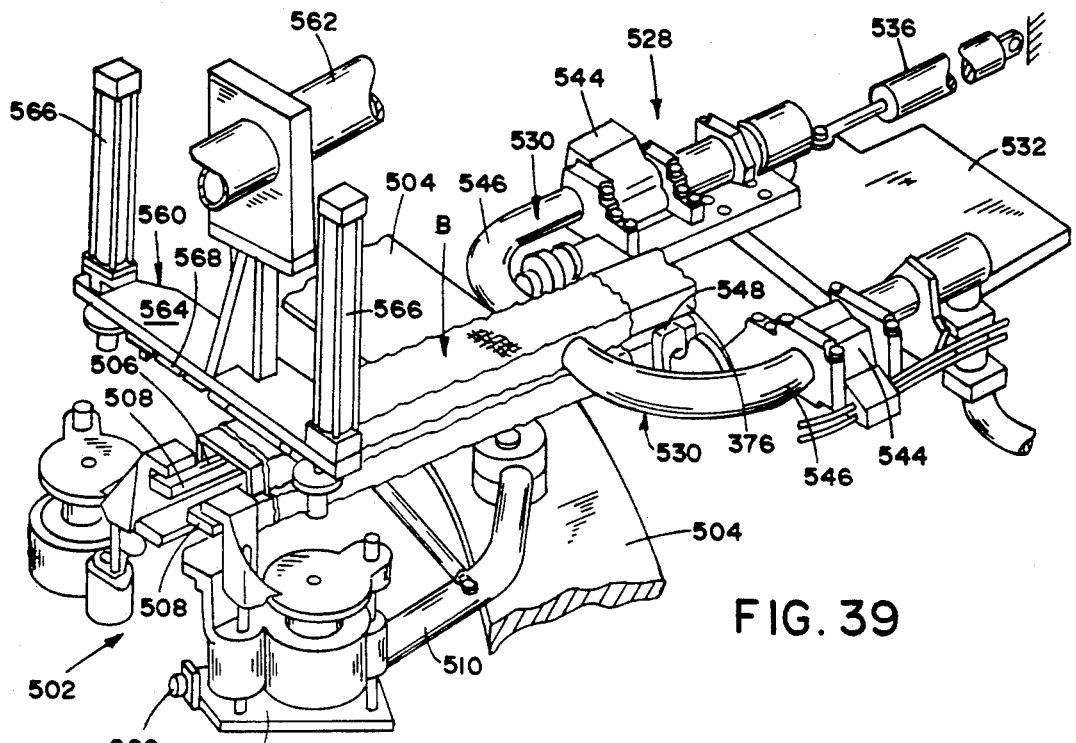
Figure 40:
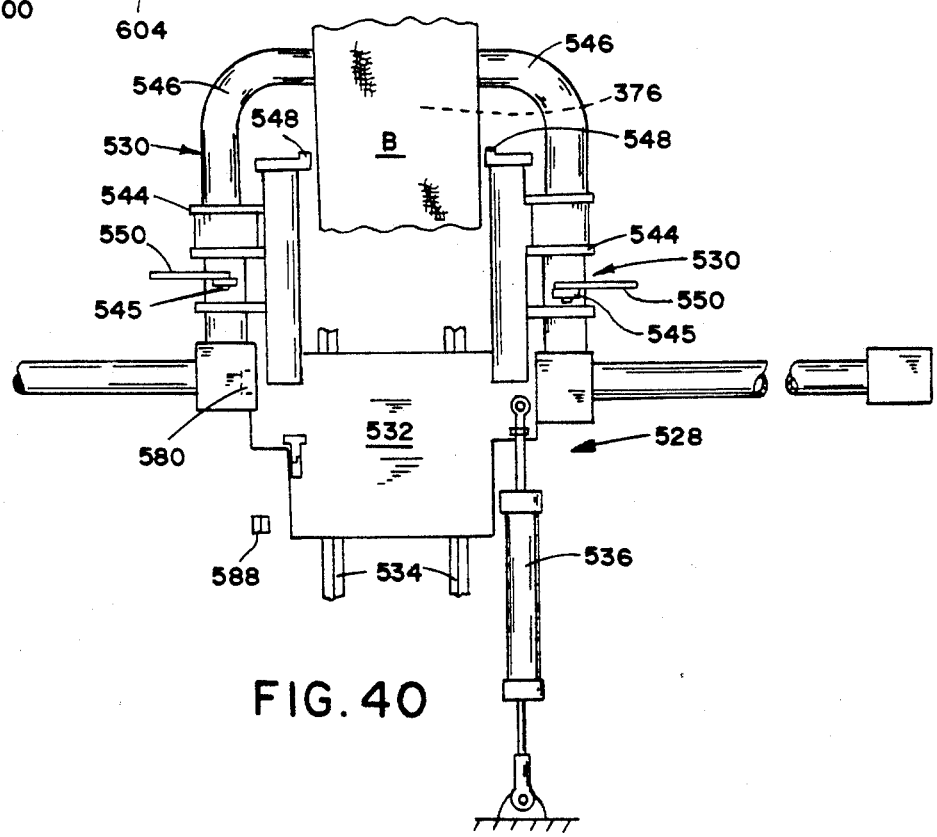
Figure 41:
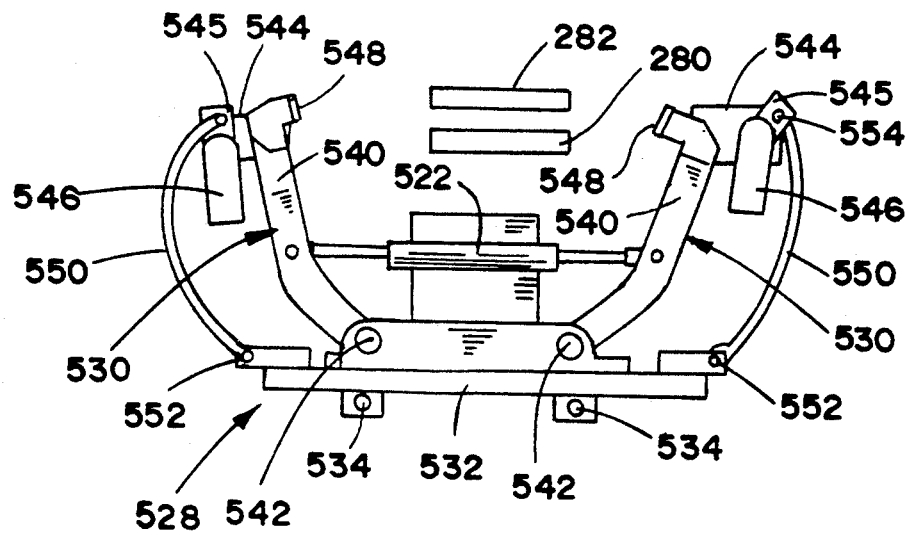
Figure 42:
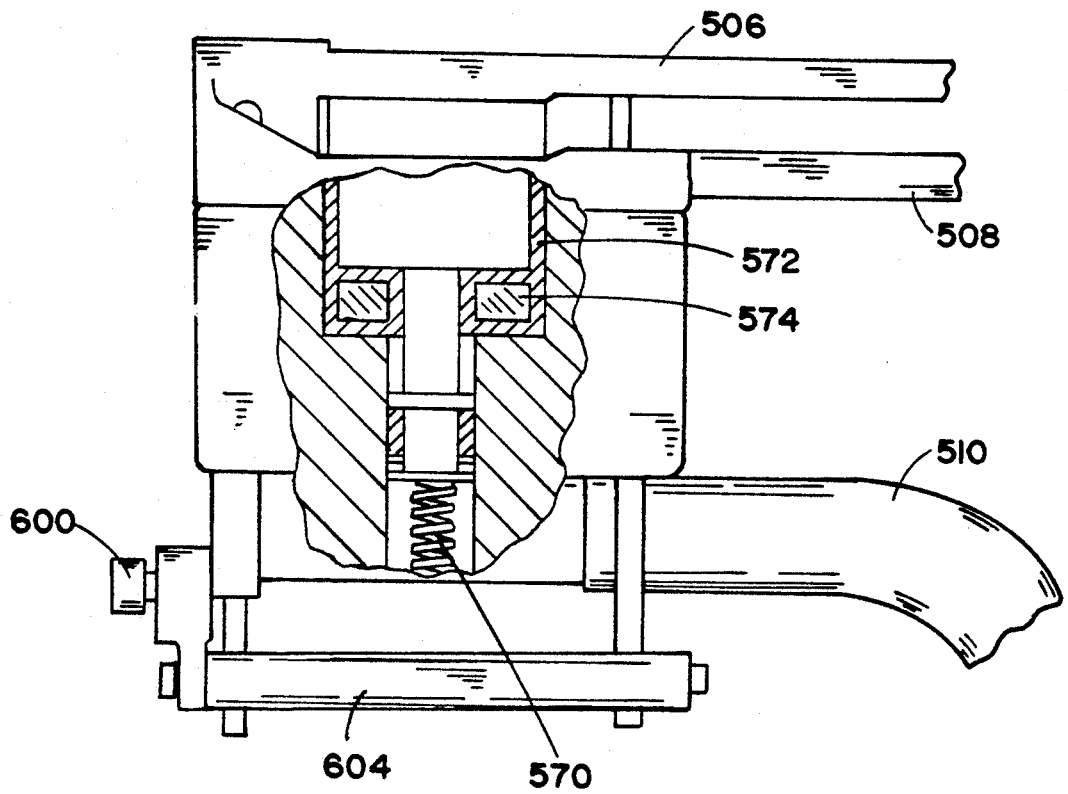
Figure 43:
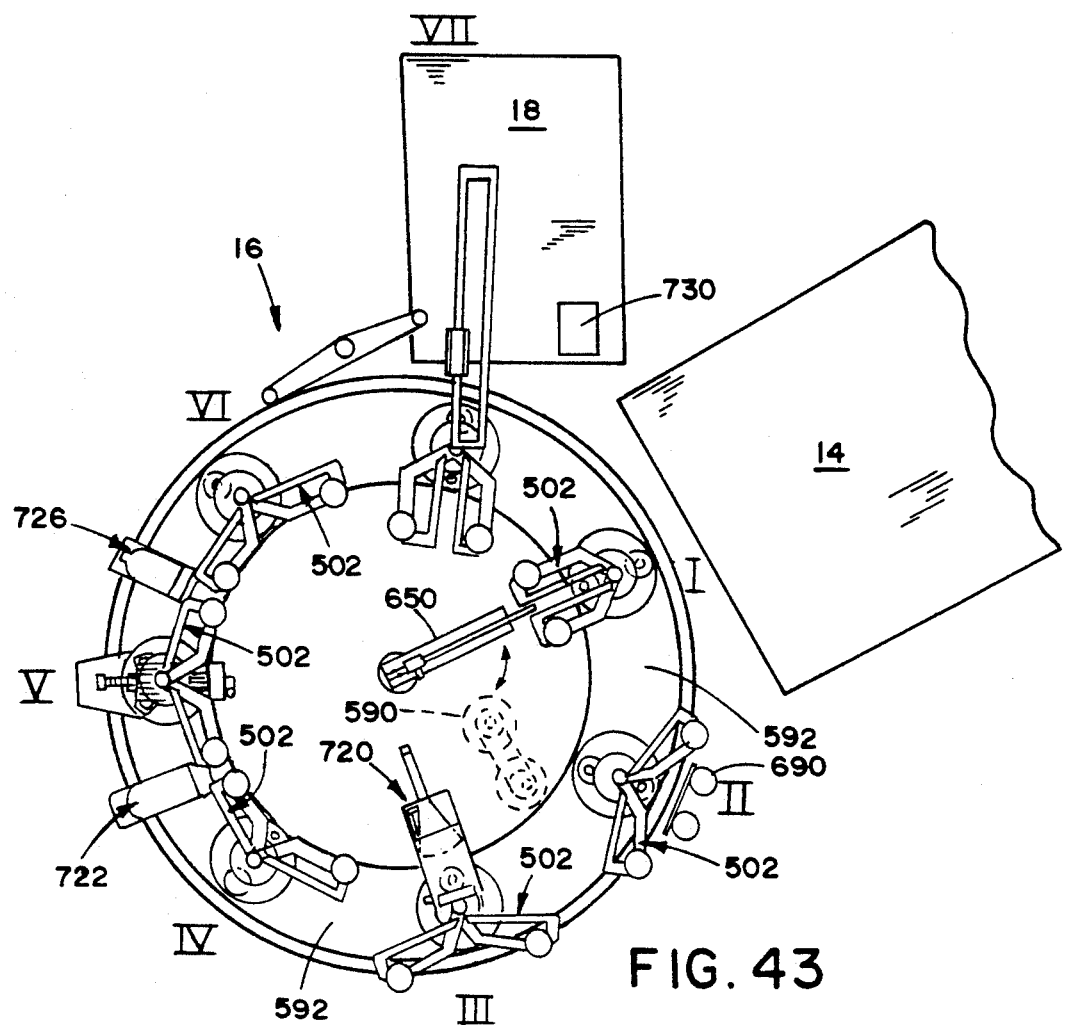
Figure 46:
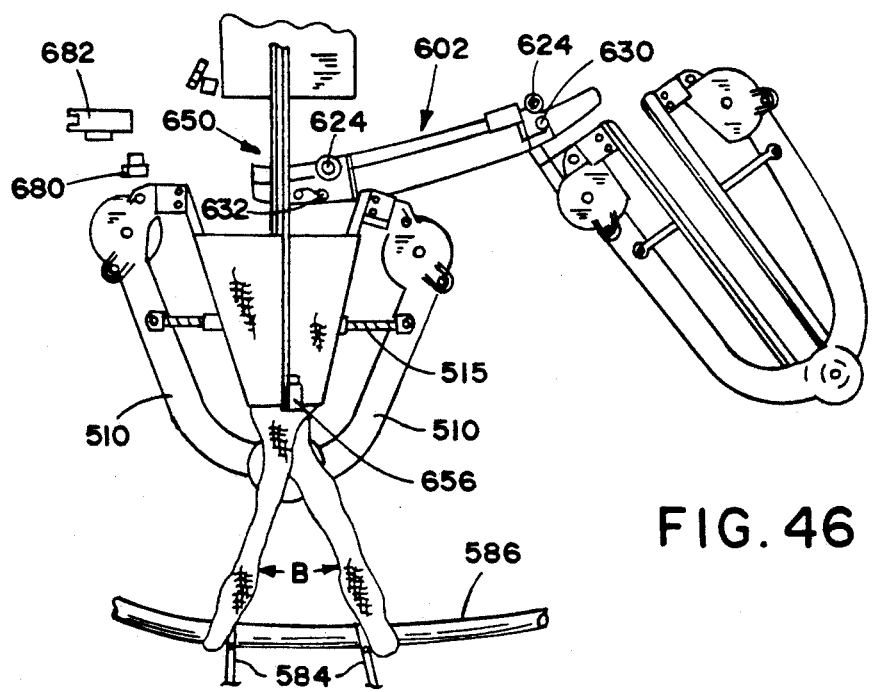
Figure 44:
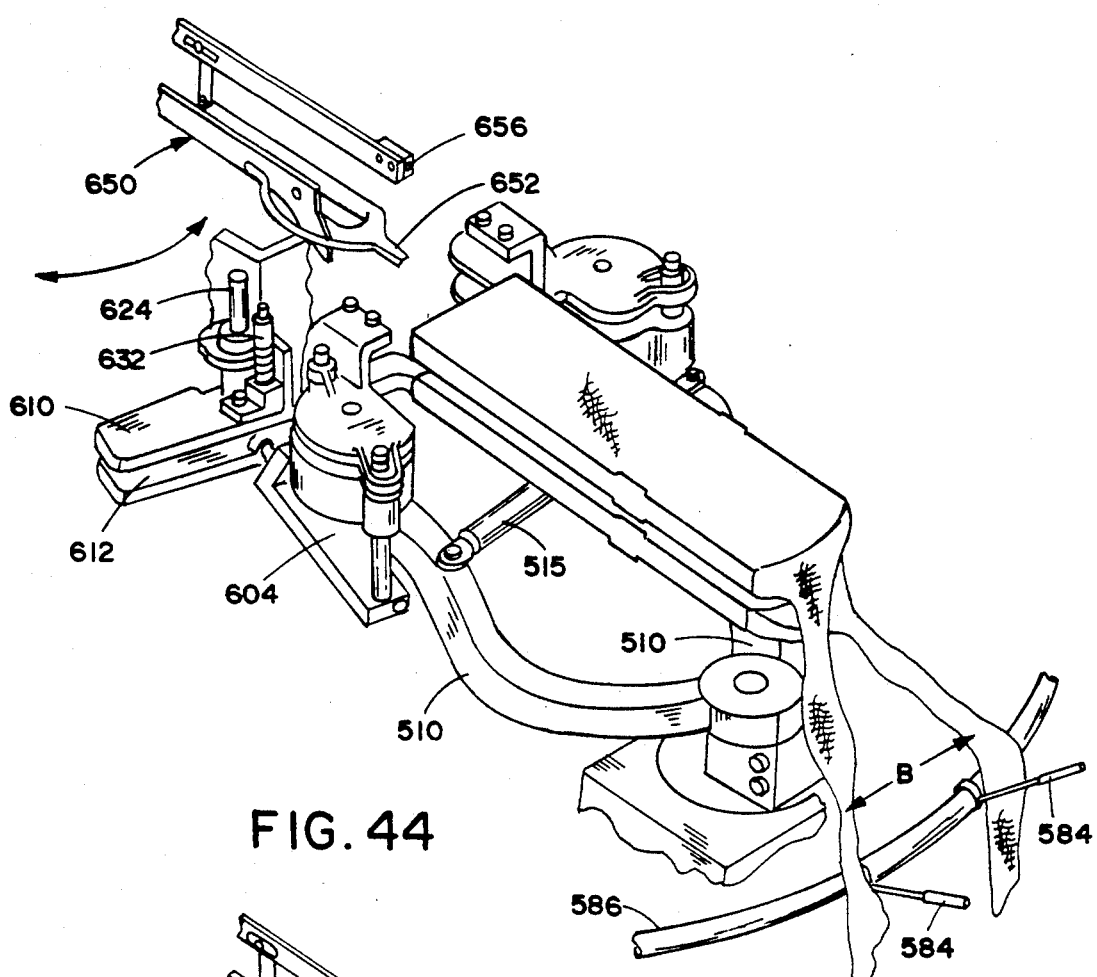
Figure 45:
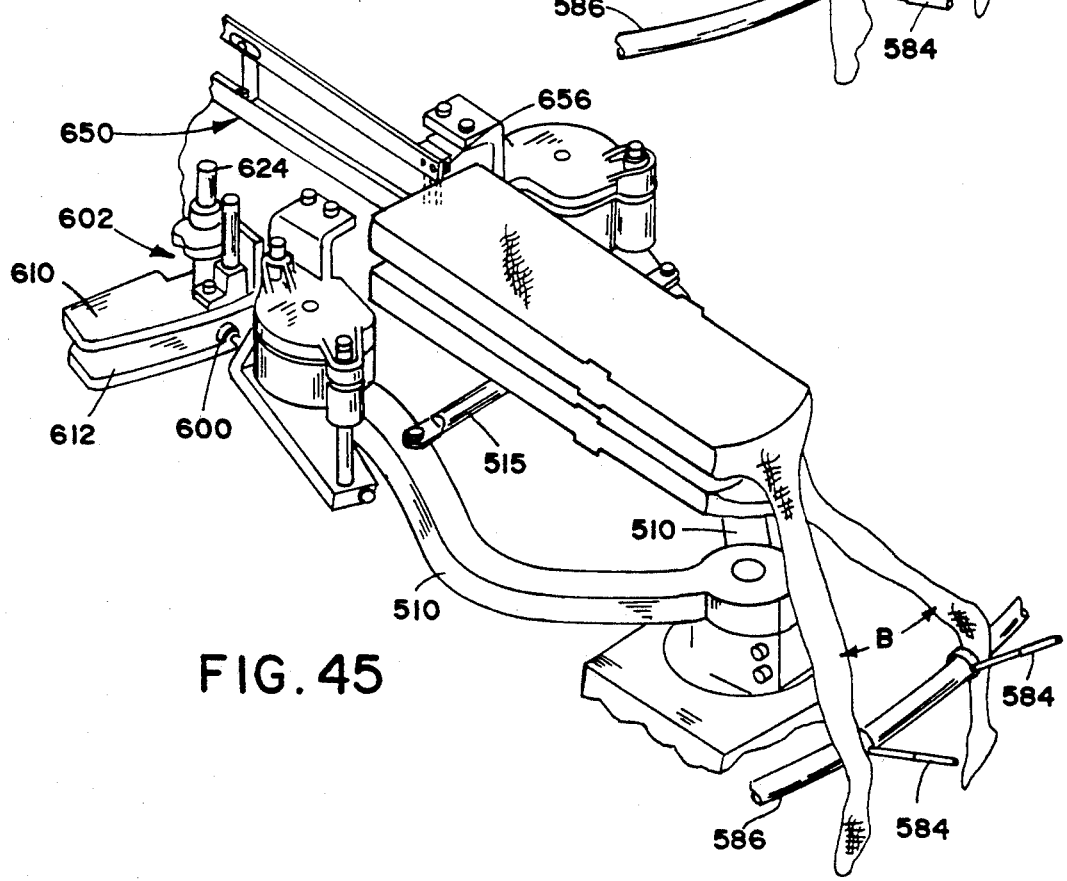
Figure 47:
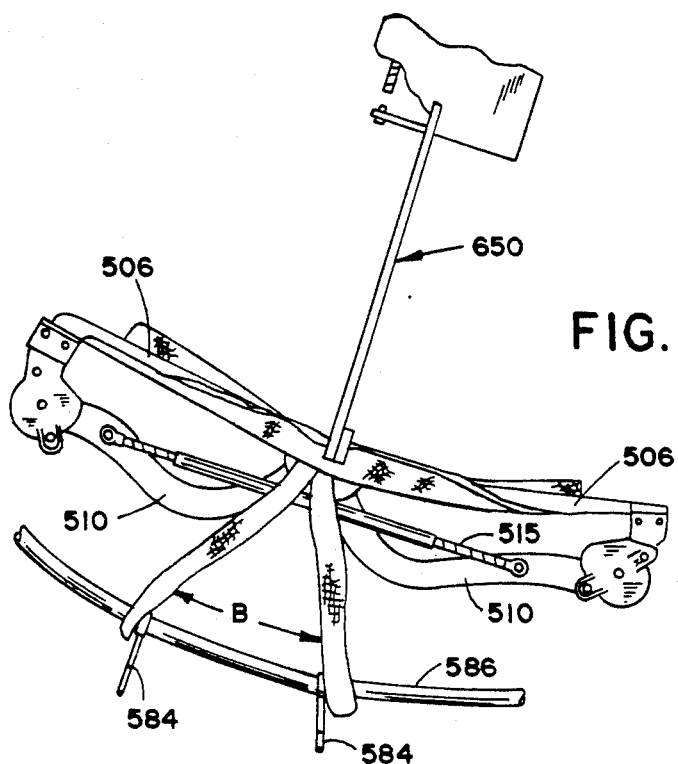
Figure 48:
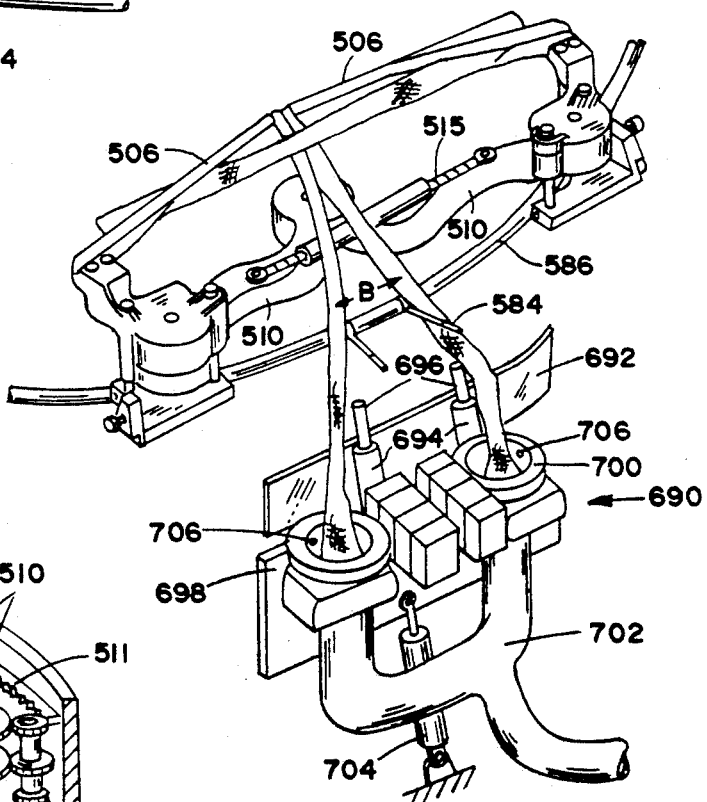
Figure 49:
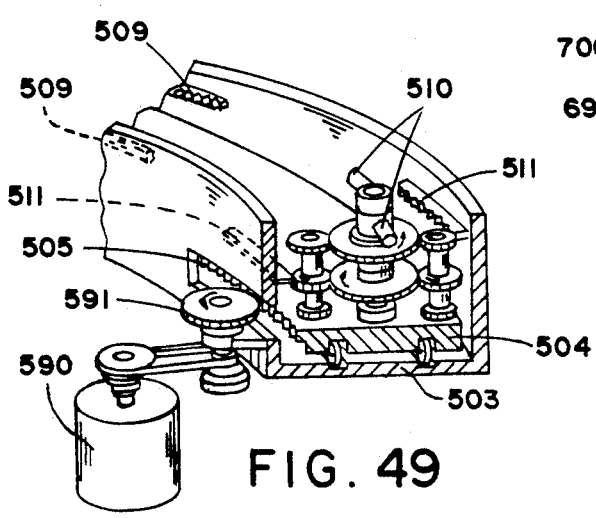

is a schematic perspective view of the apparatus;

FIG. 3 is a schematic, fragmentary view of one embodiment of the hosiery blank pick-up and orientation assembly and blank opening assemblies;

FIG. 4 is an enlarged, schematic view of the band portion of a hosiery blank being advanced first through a trap;

FIG. 5 is an enlarged, schematic view of the toe portion of a hosiery blank being advanced first through a trap;

FIG. 6 is a fragmentary, schematic, elevational view of a magazine assembly illustrating the direction of displacement of hosiery blank therefrom;

FIG. 7 is a view similar to FIG. 6 and illustrating the direction of movement of a hosiery blank therefrom;

FIG. 8 is a schematic, sectional, side elevational view of an opening box with a hosiery blank just entering the same after exit from a magazine assembly;

FIG. 9 is a sectional view of a hosiery blank clamping mechanism prior to receiving a blank;

FIG. 10 is a sectional view of the hosiery blank clamping mechanism having the band end of a hosiery blank clamped therein;

FIG. 11 is a view of an opening box similar to FIG. 8 with a hosiery blank clamped therein;

FIG. 12 is a schematic, sectional, elevational view of the opening box with the welt end portion of a blank being clamped therein, and with the blank toe end portion being opened outwardly;

FIG. 13 is a schematic, sectional view of the opening box after the band portion of the blank has been released, and with the expanded, opened toe portion being advanced outwardly of the opening box;

FIG. 14 is a perspective view of the end of an opening box with fixed and displaceable grill thereof being aligned;

FIG. 15 is a perspective view of an opening box with the displaceable grill in the advanced position;

FIG. 16 is a perspective view of the displaceable grill in the advanced position a. d with a hosiery blank positioned thereon;

FIG. 17 is a perspective view of an end of a pick-up tube illustrating the slit therein;

FIG. 18 is a fragmentary, perspective view of the loading robot assembly for transferring hosiery blanks from the opening box to loading frames of a turret assembly;

FIG. 19 is a schematic, fragmentary, side elevational view of the loading robot assembly and a turret assembly;

FIG. 20 is a schematic elevational view of the fingers of the loading robot assembly in an opened condition;

FIG. 21 is a view similar to FIG. 20 but with the fingers in hosiery blank gripping positions;

FIG. 22 is a side elevational view of a pair of loading frames illustrating the relationship of one frame relative to a plurality of sensors;

FIG. 23 is a view somewhat similar to FIG. 22 illustrating sensors for the other loading frame;

FIG. 24 is a schematic, fragmentary view of a loading frame and illustrating a roller assembly for positioning the toe portion of a hosiery blank thereon;

FIG. 25 is a schematic, fragmentary, side elevational view of a mechanism for raising and lowering the toe positioning roller assembly relative to a loading frame, and gripper robot assembly for gripping and shifting a blank relative to the loading frame;

FIG. 26 is a schematic, fragmentary plan view of the drive arrangement for the rollers of the toe positioning roller assembly;

FIG. 27 is a schematic, fragmentary, perspective view of the toe positioning roller assembly and the gripper robot assembly positioned in engagement with a loading frame;

FIG. 28 is a schematic elevational view of a turret assembly having a series of pairs of loading frames thereon for indexing to various stations;

FIG. 29 is a fragmentary, perspective view of an assembly for removing pleats from blanks positioned on loading frames;

FIG. 30 is a fragmentary, perspective view with the blanks advanced in position overlying displaceable rods of the pleat remover assembly;

FIG. 31 is an enlarged perspective view of one pair of the rods of the pleat removal assembly prior to having the hosiery blank positioned thereover;

FIG. 32 is a fragmentary, perspective view of the turret assembly and illustrating the assembly for advancing the blanks in overlapping relation with the rods of the pleat removal assembly;

FIG. 33 is an enlarged perspective view of the drive arrangement for advancing the blanks to the pleat removal assembly;

FIG. 34 is a perspective view of a loading frame;

FIG. 35 is an end view of the pleat removal assembly with the pleat remover rods positioned within the confines of loading frames;

FIG. 36 is an end view similar to FIG. 35 with the rods rotated to positions intermediate the loading frames and the blanks thereon;

FIG. 37 is a side elevational view of a drive arrangement similar to that shown by FIG. 33 for advancing the shells of a pair of loading frames to position a pair of blanks over a pair of clamp jaws of a pantyhose seaming machine;

FIG. 38 is a fragmentary, schematic, perspective view of portions of the pantyhose seaming machine and illustrating a guiding and clamping arrangement for the clamp jaws;

FIG. 39 is a schematic, fragmentary perspective view of a clamping assembly of the pantyhose seaming machine and the blank gripper and positioning robot in position for transferring a pair of blanks from the loading frames to the pantyhose seaming machine clamping assembly;

FIG. 40 is a schematic top plan view of the blank gripper and positioning robot;

FIG. 41 is a schematic front elevational view of the blank gripper and positioning robot;

FIG. 42 is a schematic side elevational view of a supporting assembly for a pair of clamp jaws;

FIG. 43 is a schematic top plan view of the pantyhose seaming machine in relation to a toe closer machine and the blank transferring and positioning assembly;

FIG. 44 is a schematic, perspective view of hosiery blanks gripped by clamp jaws of the pantyhose seaming machine prior to severing of the blanks by a cutter assembly;

FIG. 45 is a view similar to FIG. 44 with the cutter assembly moved into position for severing the blanks;

FIG. 46 is a schematic perspective view of the gripped pantyhose and clamp jaws as they start to open as the jaws are indexed to the next station;

FIG. 47 is a top plan view of the blanks and clamp jaws in the open position;

FIG. 48 is a fragmentary, schematic view of a clamping assembly of the pantyhose seaming machine positioned in alignment with a blank sensing assembly;

FIG. 49 is a fragmentary perspective view of the mechanism for opening and closing the pantyhose seaming machine clamping assemblies between the positions of FIGS. 45 and 48; and FIG. 50 is a block diagram of the various assemblies and the microprocessor.

DETAILED DESCRIPTION OF THE INVENTION

Figure 1:
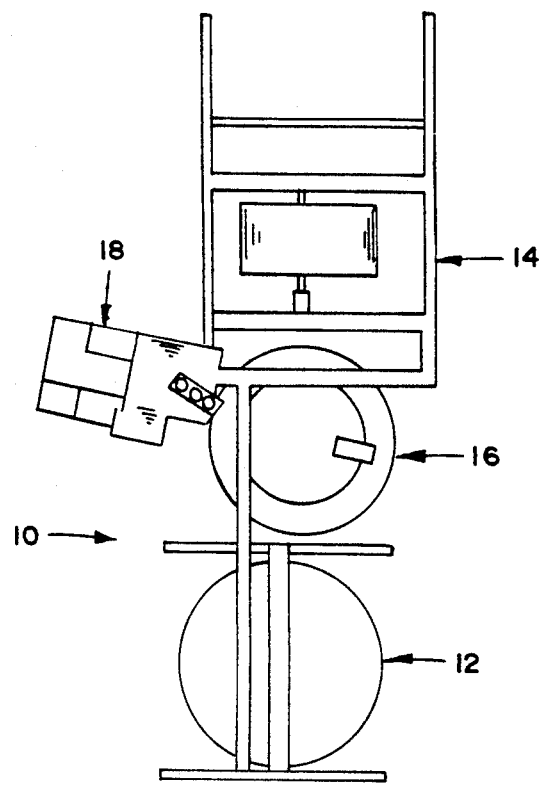
FIG. 1 is a schematic general plan view of the pantyhose production apparatus of the present invention.
Figure 2:
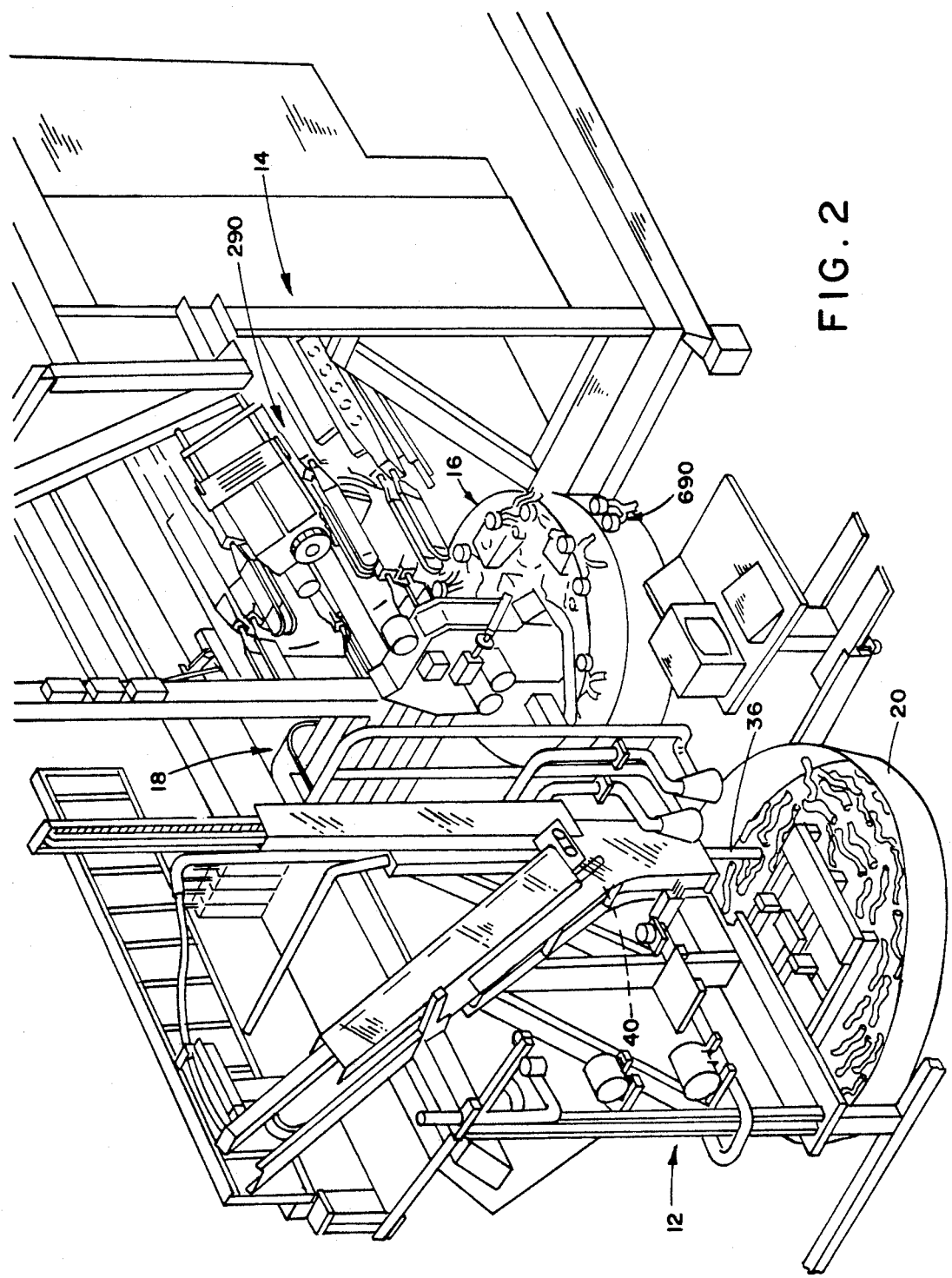

Referring to the drawing, and initially to FIGS. 1 and 2, the pantyhose forming system of the present invention includes a pick-up transfer and orientation assembly 12, a positioning and transferring assembly 14, a pantyhose seaming machine 16 and toe closer assembly 18.

Referring initially to the pick-up transfer and orientation assembly 12, as shown schematically in FIGS. 1-3, elongated thin flexible articles such as knit fabric hosiery blanks B are loosely and randomly supplied to a reservoir 20. The circular reservoir is mounted upon a shaft 22 and continuously driven by a motor 24 for rotation about a generally vertical axis. Each blank has a band end W and a toe end E.

The assembly 12 includes two pick-up and transfer mechanisms 26 and 28 which function to individually pick up randomly oriented blanks from the rotating reservoir 20 and position them at the inlet end 30 of a pneumatic conveyor assembly 32. The conveyor assembly 32 serves to deliver the blanks to a magazine assembly 34.

The pick-up transfer mechanism 26 includes a tube 36 mounted for vertical reciprocable displacement through a conventional drive arrangement 38 by an electric motor MX. Pick-up transfer mechanism 28 has a similar tube 40 positioned at an angle with respect to the tube 36 and mounted for reciprocable displacement by motor MZ and drive arrangement 42.

The operation of each of motors MX and MZ is controlled by a microprocessor MP, FIG. 50. Upon receiving a signal from the microprocessor MP, motor MX displaces the pick-up tube 30 downwardly until the photocell 44 senses a blank and deactivates the motor MX with the lower end portion of the tube 36 within the reservoir 20.

It is to be noted that each of the tubes has coupled thereto a vacuum conduit, a compressed air conduit and an electrical line connected to a photocell. The lower end portion 37,41 of each of tubes 36,40 is provided with a small opening, shown in FIG. 17. Vacuum is created in conduit 48 and tube 36 by vacuum motor V1, and in conduit 50 and tube 40 by vacuum motor V2.

When a hosiery blank B in the reservoir 20 is pulled by vacuum in tube 36 partially through the lower end portion 37 of tube 36, photocell 44 mounted adjacent the end of the tube detects the presence of a portion of the blank fabric and is activated thus sending a signal to the microprocessor MP which again activates motor MX to move the tube 36 vertically upwardly carrying with it a blank B. As the end of the blank passes the photocell 52, and it is no longer detected by the photocell 52, the motor MX is deactivated through a signal from photocell 52 to the microprocessor and to the motor MX. The microprocessor, in turn, sends a signal activating motor MZ to move the lower end portion 41 of tube 40 downwardly. The vacuum motor V2 creates a vacuum through conduit 50 and tube 40 and the lower ends of the tubes 40,36 are positioned adjacent to each other.

The pick-up system is such that by utilizing two tubes 36 and 40, a blank B is always held adjacent one end which is the main condition for the following operation of the orientation system. This system increases the probability of having just one blank on tube 40.

A portion of the hosiery blank remote to that held by the vacuum tube 36 is pulled by vacuum in tube 40 partially through the lower end portion thereof thus activating photocell 43 sending a signal to the microprocessor which, in turn, reverses motor MZ and tube 40 begins to move upwardly. Substantially simultaneously with the reversal of motor MZ the microprocessor sends a signal to a solenoid valve 54 energizing the same thus permitting a blast of compressed air to be discharged through a conduit 56 and tube 36 thus blowing the blank B away from the tube 36. The tube moves a prescribed distance, the distance being programmed into the microprocessor MP which is sufficient to permit the free end of a blank B held thereby to be positioned adjacent the inlet end 30 of conduit 62, and sends a signal to the motor MZ to reverse the direction to start movement of the tube 40 back downwardly. As tube 40 descends, the portion of the blank remote to that being held by the tube 40 is drawn by vacuum into conduit 62 and past photocell 74.

Positioned in the conduit 62 beyond the photocell 64 is a trap 66 for sensing whether the toe portion E or the band portion W of a blank B enters the trap first. Referring to FIGS. 3, 4 and 5, the concentration or volume of yarn in the band end is greater than that in the toe end. The trap 66 is a two part trap having an opening therein large enough to receive the toe end of a blank therethrough, but not large enough to receive therethrough the greater volume of yarn in the band end of the blank. The toe end of a blank held by vacuum in tube 40 moves past photocell 64, through trap 66 and past photocell 68. When the toe end moves past photocell 68 the photocell is activated to do two things. A signal is sent to the microprocessor which activates a solenoid valve 70 to permit compressed air to move through the conduit 72 and tube 40 to blow the blank away from the pick-up tube, and two part trap 66 is opened permitting the blank band end to flow therethrough. Vacuum is created in conduit 62 by a vacuum motor 76 as will be later described. The band portion of a blank held by tube 40 can move past photocell 64 but cannot go through the two part trap 66. Tube 40 continues to move downwardly to a prescribed distance greater than the distance between photocells 64 and 68. At the end of this movement, if photocell 68 is not activated, two things happen. A signal is sent to the microprocessor which activates solenoid valve 70 to permit compressed air to move through conduit 72 and tube 40 to blow the blank away from the tube and two part trap 66 opens permitting the blank to flow therethrough.

After passing the photocells 64,68 and trap 66, the blank flows in conduit 62 past trap 78 and photocell 80 and to the magazine assembly 34.

The magazine assembly 34 includes a moveable conduit section 82 which is coupled to conduit 62 and displaceable by fluid means 84 between substantially identical conduit assemblies 86 and 88. Each of the assemblies 86 and 88 includes a loop or curved portion 90, generally parallel linear portions 92,94 a blank entrance portion 96, having a trap 122 therein, for receiving a blank from displaceable conduit section 82, and an exit portion 98. The displaceable conduit section 82 permits blanks sequentially advanced through conduit 62 to be alternately directed from one conduit assembly 86 or 88 to the other.

The magazine assembly also includes a conduit 100 communicating with conduit portions 94 of the assemblies 86 and 88. Conduit 100 is coupled to a vacuum motor 102 through conduit 104. Traps 106 and 108 are provided in conduit 100 and a trap 110 is provided in conduit 104. Traps 112,112 are coupled to conduit portions 94. Traps 116,116 are provided in portions 92 and traps 120,120 are provided in portions 94 of the conduit assemblies 86,88.

Referring to FIGS. 3, 6 and 7, assuming that a blank B is directed through conduit 62, displaceable conduit section 82, conduit 96 and into portion 94 of assembly 88, the photocell detector 80, upon sensing the passing blank, directs a signal to the microprocessor MP which closes traps 108 and 106 to disrupt the vacuum flow, and to open trap 112. Vacuum is created in portion 94 by vacuum motor 102 through conduits 104 and 100.

The traps 106,108 and 112 of assemblies 86 and 88 are controlled by the microprocessor in a particular sequence depending on whether the band portion or the toe portion of the blank enters the conduit portion 94 first. Each trap 122 is positioned in the opened or closed position depending upon whether vacuum is through assembly 86 or 88. Referring to FIG. 6, if the welt portion W of the band enters conduit or exits portion 94 first, the blank exits to the left welt portion first and travels through exit conduit 98. If the toe portion E enters conduit 94 first, then the blank initially moves as shown in FIG. 7, through conduit portions 90 and 92 such that the welt or band portion enters conduit 98 first. As previously described, the photocells 64,68 determine whether the band end or the toe end of the blank first enters conduit 62 and sends a signal to the effect to the microprocessor which then stores such signal. If the welt end is first into conduit 94, the microprocessor opens traps 108,122 and maintains closed traps 112 and 116 such that a vacuum in exit conduit 98, from a source to be subsequently described, pulls the blank welt end first towards an opening assembly 132. A separate opening assembly 130 is provided for receiving blanks directed through conduit assembly 88. Since the assemblies are identical, only one will be described.

The traps 112 and 114 serve to permit air in front of the travelling blanks to exhaust such that the blanks stop in the conduit portion 94 of the magazine assembly.

Vacuum is created in the exit conduit portions 98 through conduit 97, traps 99 and vacuum motor 101. Assuming that a blank is positioned toe end first, as in FIG. 7, trap 116 is opened and trap 120 closed permitting the vacuum created by motor 101 to draw the blank band end W first through conduit portions 90,92 and 98 towards an opening box. As the blank travels through conduit 98 it is detected by photo-sensor 128 which turns off the vacuum by closing trap 99 and opening trap 103 which reduces the vacuum. At this time trap 105 in conduit 98 is closed. The blank is now in conduit 98 waiting to move into the chamber of an opening assembly 130 or 132. Trap 107 also is closed. While the opening assemblies 130 and 132 are substantially identical, the operation of only opening assembly 132 will be described.

The opening assembly 132, FIGS. 8-16, includes a fixed elongated tubular section 134, an inner tubular section 136 mounted for displacement within the section 134, and an elongated rod-like section 138 positioned within the section 136 and mounted for displacement relative to the sections 134 and 136. The rod-like section 138 and the inner tubular section 136 are capable of being displaced together horizontally as a unit relative to the outer section 134 by means of pulleys 140,142, belt 144 and reversible motor 146. The belt 144 is coupled to the section 136 by a mechanism 145. The rod-like section 138 also is capable of being displaced relative to the inner tubular section 136 by a fluid cylinder 148 which is attached to the section 136.

The end of the rod-like section 138 opposite to that of the cylinder 148 is provided with a ball element 150 pivotably coupled thereto. The end portion 152 of the inner tubular section 136 is tapered or angled as shown by FIGS. 9 and 10 such that upon activation of the cylinder 148 and displacement of the rod-like section 138, the ball element grips or wedges between it and the angled portion 152 the band portion W of a blank B. At the forward end of the assembly is a door or plate 170 displaceable in a vertical plane by a fluid cylinder 172.

Vacuum motor 76 provides a vacuum in the chamber of opening box 134. The trap 162 in conduit 164 is open. The microprocessor MP opens trap 105 to permit the vacuum created by motor 76 to draw the blank into box 134 and at the same time opens trap 113 to exhaust the air in front of the blank.

When the band end W of the blank B passes the photocell 180. FIG. 8, a signal is sent to the microprocessor which in turn operates solenoid 182 to activate fluid cylinder 148 to move the ball element 150 to the right, FIG. 11, to clamp the band end W of the blank against surface 152. During this time the cylinder 172 has the door 170 in the closed position.

The sensor 180 also signals the microprocessor which activates motor 146 to move elements 136,138 together as a unit to the left, FIG. 12. At the same time trap 162 closes and traps 186 and opens 107 permitting a suction force to be directed through the chamber and a grill assembly 190 and conduit 192 by the vacuum motor 76.

The grill assembly, FIGS. 14, 15 and 16, includes fixed grill section 192 and a displaceable grill section 194. The displaceable section 194 is substantially longer than the fixed section 192 and is moved by a fluid cylinder 196 between a retracted position, as shown by FIGS. 13 and 14, and an extended position, as shown by FIGS. 15 and 16. The cylinder 196 is shown schematically in FIG. 3.

Vacuum is drawn through the fixed grill 192 via trap 186 and conduit 192 while vacuum is drawn through the movable grill 194 via conduits 198 and 192. As the blank moves to the left, FIG. 13, the toe end E of the blank is detected by sensors 200 and through the microprocessor the trap 113 opens to reduce the vacuum in the opening box chamber and to actuate cylinder 148 to release the ball element 150. Vacuum is still directed to both grill sections via the open traps 107,186 prior to release of the ball element. The door 170 is closed during this time and the toe end of the blank is presented opened as a flower, FIGS. 13 and 16, on the end portions of grid sections 192,194. Just as the ball is released the trap 186 closes and vacuum is directed only through the movable grill 194. The door 170 at the end of the opening box 132 may now be opened by air cylinder 172 and the movable grill 194 displaced forwardly by the fluid cylinder 196. The cylinder 172 is actuated by the microprocessor MP to open door 170 once the trap 186 is closed.

The operation of the fluid cylinder 196 is controlled through the microprocessor upon the positioning of a loading robot assembly 210 at a prescribed position. The loading assembly 210, FIGS. 18 and 19 is displaceable along a generally horizontal plane by a drive belt 212 extending between pulleys 214,216, the pulley 214 being driven by a motor 218. The assembly 210 is fastened to belt 212 in a conventional manner.

A sensor 220 is provided to detected when the loading robot 210 is in a fixed position adjacent the parallel opening box assemblies 130,132. The sensor, through the microprocessor MP, actuates the cylinder 196 to displace the moving grill 194 outwardly to the FIG. 16 position. Upper and lower notches 222 are provided between the two portion of the movable grill for receiving loading fingers 230,323 therein, as will be hereinafter described.

Normally a blank is positioned in each of the loading box assemblies 130,132.

The loading robot assembly 210 includes two pairs of loading fingers 230,230 and 232,232 one pair of each of the opening assemblies 130,132. Fingers 230 are attache to the end portions of opposed arms 234 and pivotably connected as at 236 to a frame section 238. The opposed arms 234,234 are adapted for movement between the closed positions of FIG. 20 and the opened positions of FIG. 21 by a fluid cylinder 240 which is operable by a solenoid 242. Oppositely extending portions of the fluid cylinder are pivoted to the arms 234 at 244. Opposed arms 246,246 supporting fingers 232,232 are operated in a similar manner by a solenoid operated fluid cylinder 248 which is coupled thereto at 250. The arms 246,246 also are pivotably supported as at 236,236. Also supported on frame section 238 are a series of adjustably positioned fixed roller members 252 adapted to be engaged by the fingers 230,230 and 232,232 when the fingers are in the FIG. 21 position so as to clamp the toe end of a blank therebetween.

Upon the proper positioning of a blank in the chamber of the opening assembly 132, the loading assembly 210 is at the FIG. 18 position, its presence having been detected by sensor 220 and the fingers 230,230 and 232,232 are in the closed, FIG. 20 position. When the grill 194 is fully extended by the fluid cylinder 196, such position is detected by sensor 260, FIG. 13, a signal is sent to the microprocessor MP which, in turn, signals solenoid 242 to supply air pressure to fluid cylinder 240. The fingers 230,230 as they begin to open, pass through the slots 222,222 (FIG. 15) engaging the blank toe end portion E and stretching open the toe portion and clamping it between the fingers and the roller members 252. Sensors 262, FIG. 21 are provided to make sure that a blank portion is on each of the fingers 230,230. If not, the fingers will close and the blank will be extracted by vacuum rearwardly through the opening box and to a collection reservoir. When the fingers 230,230 are in the FIG. 21 open positions the vacuum to the moving grill 194 is turned off.

The same process is required in gripping a blank in the chamber of opening box assembly 130 and sensing by photocells 270,270, FIG. 21, the presence of the blank on fingers 232,232. Once a first blank is properly positioned on fingers 230,230 and on second blank is positioned on fingers 232,232 the photocells or sensors 262,270 sends a signal to the microprocessor which activates motor 218 to drive belt 212 to move the loading robot 210 to the right, FIGS. 18,19 to pull the open toe end portions of the blanks over a pair of loading frames 280,282 with the toe portions E at a predetermined point. When The band ends W of the blanks move past sensors 284,284, FIG. 19, the microprocessor activates the solenoids 242 and fluid cylinders 240,248 to move the fingers 230,232 to the FIG. 20 position thus releasing the blanks. At the same time the microprocessor activates motor 218 to move the robot loading assembly to the leftmost position, FIGS. 18 and 19 until it is sensed by photocell 220. The blanks are now positioned on the loading frames 280,282 in a prescribed manner.

The loading frames 280,282 are part of a turret assembly 290, FIGS. 2 and 28 which is selectively driven by a motor 292 and a gearing 294 for rotation about a horizontal axis. The turret assembly 290, which is included as a portion of the positioning and transferring assembly 14, is selectively indexed in a clockwise direction by motor 292 past six stations, A, B, C, D, E and F, FIG. 28. The turret assembly includes six radiating support sections 296, each supporting thereon a pair of loading frames 280,282.

At station A, blanks are removed from the loading box assemblies by the loading assembly 210 and fingers 230,230,232,232 and placed on an adjacent pair of loading frames 280,282. The loading frames having blanks thereon are indexed 60 degrees to station B where the band, microband and toe portions of the blank on the innermost loading frame 282 are selectively positioned.

The turret assembly is again indexed 60 degrees to station C where the blank on the outermost loading frame 280 is properly positioned, similar to the inner blank at station B. The properly positioned blanks on the frames 280,282 are indexed to station D where, as will be subsequently described, any pleats are removed from the blanks. The blanks are then indexed to station E where they are transferred to the pantyhose seaming machine 16. Any blanks not properly transferred to the pantyhose seaming machine 16 may be removed from the loading frames at station F.

When the loading robot 210 is moved by drive belt 212 and sensed by detector 220, the turret motor 292 is activated to index the turret 60 degrees from station A to station B. At this station a gripper robot assembly 300 shown schematically in FIGS. 25 and 27 is provided to position the blank on the inner loading frame 282 in a prescribed manner, depending on the blank length, style, etc. The gripper robot assembly 300, FIG. 27, includes a trolley 302 displaceable along and elongated guide member 304 by a belt 306 driven by a reversible motor 308. The trolley is secured to one run of the belt 306 in a conventional manner. Depending from and pivotably attached to the trolley are opposed depending arms 310 having gripper rollers 312 secured to the lower end portions. A fluid cylinder 314 is pivotably connected to each arm for selectively moving the rollers 312 into engagement with the edge portions of loading frame 282 or for gripping and slidably selectively positioning a blank on the loading frame.

A toe portion positioning roller assembly 316, FIGS. 24, 25 and 26 is provided to winding or pulling the toe portions of the blank on the loading frame 282. The toe roller assembly 316 includes a pair of opposed rollers 318,318 adapted to be selectively moved by a fluid cylinder 320 into and out of engagement with the side or edge portions 322 of the loading frame 282. The rollers 318,318 are driven by a reversible motor 324 through a conventional drive arrangement 326 of belts and pulleys, shown schematically in FIGS. 26 and 27 to either pull portions of the blank on the frame 282 and onto portions 283 thereof or to feed portions of the blank from portions 283 back towards the central portion of frame 282.

The driven rollers 318,318 are displaceable between the positions of FIGS. 25,27 and an elevated position, FIG. 24, above the loading frame 282 by an elongated worm gear 330 driven by reversible motor 332. The rollers 318,318 are supported from a frame assembly 334, pivotably connected to parallel arms 336 which, in turn, are pivotably supported from a fixed frame 338. The frame assembly 334 includes members 340 attached to a coupling or gear member 342 that is displaceable along worm 330 upon rotation of motor 332 to either raise or lower the rollers 318,318.

The operation of the rollers 312,312 and 318,318 will now be described. After the turret rotates the inner and outer loading frames 282,280 to the station B, the microprocessor activates motor 308 to move the gripper robot assembly to the right a prescribed distance. The exact distance is programmed into the microprocessor. When the robot gripper trolley 302 stops, the cylinder 314 is activated to move the gripper rollers 312,312 into engagement with the blank on the loading frame 282. The microprocessor again activates motor 308 to start moving the trolley 302 again to the right. This action causes the blank to slide along the loading frame 282, and the blank toe portion extends onto portion 283, FIG. 25, of the loading frame. Once the band portion W of the blank passes the sensor 350, FIG. 22, a signal is sent to the microprocessor which reverses the direction of the drive motor 308 to halt movement of the trolley to the right and start moving the trolley to the left, FIGS. 22 and 27. Movement of the trolley 302 and clamped blank continue to move left until sensor 352, FIG. 22, detects the blank band W. When the band is sensed a signal is sent by sensor 352 to the microprocessor which stops the trolley 302 and which activates the reversible motor 332 to lower, through driven worm 330 and parallel linkage 336, the frame assembly 316, from an upper position to the lowered position of FIGS. 25 and 27, and the fluid cylinders 320,320 actuated to clamp the rollers and blank against the side edges of the loading frame 282. Also, at the same time the microprocessor MP activates the motor 324 to drive through the driven arrangement 326 the roe rollers 318,318 which pulls the toe end of the blank from the reduced portion 283 of the loading frame and back onto the main section thereof. Once the driven rollers 318,318 move the blank toe portion past sensor 354, FIG. 22, a signal is sent to the microprocessor for controlling fluid cylinders 320,320 to move rollers 318,318 out of engagement with the blank and loading frame 282.

The gripper rollers 312,312 are now released by the microprocessor and fluid cylinder 314 and the trolley 302 is moved to the right a predetermined distance, controlled by the microprocessor, and the rollers 312,312 against move into gripping engagement with the blank to slide the blank along the loading frame 282 to the left a predetermined distance. This back and forth movement of the trolley 302 and gripper rollers is continued to move portions of the blank to the left until a sensor 356, FIG. 22, detects the juncture of the leg portion with the panty portion of the blank. When the juncture is sensed a signal is sent to the microprocessor which controls cylinder 314 to release the rollers 312.312 and move the trolley 302 to the left to a predetermined position controlled by the microprocessor. At the same time the frame assembly 316 carrying rollers 318,318 retracts to the elevated position with such rollers above the frame 282. Sensors 358 and 360, shown schematically in FIG. 27, sense when the trolley 302 and frame 316, respectively, are properly positioned and a signal is directed to the microprocessor which activates motor 292 to rotate the turret 60 degrees to Station C. At station C the same blank location process takes place to properly position the blank on the outer loading frame 280.

The turret 290 is rotated to station D where any pleats in the blanks on inner and outer loading frames 280,282 are removed.

Each of the loading frames 280 and 282 consists of a support section 370, FIG. 34 and 29 having a rounded nose or outer end section 372 and a rearward section 283 interconnected by members 374,374 which serve as support rails for a displaceable shell or sleeve 376, FIGS. 30 and 31. The section 283 is fixedly secured to the turret frame 296 in a conventional manner. The sleeve 376 is selectively displaceable along support rails 374,374 by an elongated rod 378 which extends through portion 283 for attachment to a carriage 380, FIG. 34. Note that the cross-sectional configuration of each sleeve 376 is generally U-shaped having an open portion, as best shown in FIGS. 31 and 35.

Once the turret rotates the loading frames 280,282 to Station D, a sensor 390, FIG. 28, is activated and through the microprocessor MP a motor 392, FIG. 33, drives a belt 394 which has the carriage 380 secured thereto for displacement with the belt. The carriage 380 is mounted upon fixed guide rails 396. An upstanding plate 398 is secured to the carriage 380 and has the ends of the elongated rods 378 secured thereto.

Displacement of the carriage 380 and rods 378,378 to the left, from the positions of FIG. 29 to the positions of FIG. 30, positions each sleeve 376 in overlapping relation with a pair of spaced parallel rods 400,400, which form a part of the pleat removal assembly 402.

The pleat removal assembly 402 includes a drive arrangement as shown in FIGS. 35 and 36 for rotating approximately 180 degrees simultaneously all four rods 400 between the sleeves 376 and the blanks B stretched around the sleeves to remove any pleats from the band end W of the blanks. The rods 400 are secured to pivotably displace levers 404 which, in turn, are secured to pulleys 406 having a belt 408 directed therearound so as to rotate the rods approximately 180 degrees from locations within the open portion of the U-shaped cross-section of the shells 376 to positions outwardly of the shells and then back again to the inner portions. The belt extends over a large pulley 410 driven a prescribed distance in either direction by a fluid cylinder 412.

The pleat removal assembly also includes a pair of clamps 420,420, FIG. 29 attached to levers 422 which pivot about shafts 424 by reversible fluid cylinders 426. The clamps hold the blanks steady on the sleeves 376 during movement of the rods 400 around the sleeves.

When the carriage 380 is displaced to position the end portions of the sleeves 376 in encompassing relation with the pivotable pleat removal rods 400 and with the band portions of the blanks overlapping the rods 400, a sensor 430, FIG. 33 detects the carriage 380 and through the microprocessor stops the drive motor 392 and at the same time operates the two fluid cylinders 426,426 to move the clamps 420 into engagement with the sleeves 376,376 with the blank positioned therebetween and operates the fluid cylinder 412 to displace the drive belt 408 and rotate all four rods 404 approximately 180 degrees in a first direction from within the confines of the sleeves 376 outwardly and between the sleeves and blanks so as to stretch the fabric of the blanks as shown by FIGS. 27 and 36 to remove any creases or wrinkles. Although not shown, preferably proximity switches are provided to detect the position of a magnet within cylinders 426 to insure that the clamps 420 are properly positioned prior to operation of the drive cylinder 412. When one of the rods 400 having a member 401 thereon is displaced and activates a sensor 432, a signal is sent to the microprocessor which controls the cylinder 412 to reverse its movement and move the rods 400 from the FIG. 36 positions back to the FIG. 35 positions. When the rods return to the FIG. 35 positions, a sensor 403 is activated to direct signals through the microprocessor to actuate cylinders 426,426 to release the clamp members 420,420 and to activate motor 392 to return the carriage 380 and sleeves 376,376 back to the FIG. 26 positions. After the carriage 380 returns to a predetermined position a sensor 391 deactivates motor 392 and rotates the turret to move the blanks and loading frames 280,282 to station E.

At station E, under the control of the microprocessor, the shells 376 again are driven forward by a drive assembly 438 FIG. 37. The drive assembly 438 is substantially the same as that shown by FIG. 33 and includes a drive motor 440 which selectively displaces a carriage 442 by means of belts 444,446 and pulleys 448,450. The carriage 442 is supported upon guide rods 452 and is coupled to plate 398 for displacing the loading frame rods 378,378.

At station E the blanks are transferred from the shells of the loading frames to the machine 16 where portions of the blanks are severed and resewn with a gusset therein, in a conventional manner to form the panty portion of a pantyhose garment. Briefly, the pantyhose seaming machine 16 includes seven work stations A-G FIG. 43, and seven clamping assemblies 502 which are supported on a turntable 504 and indexed to the various work stations. The clamping assemblies 502 are of a conventional type as disclosed, for example, in U.S. Pat. Nos. 4,188,898 and 4,267,785. Each clamp assembly, the operation of which will be later described includes pairs of upper and lower elongated clamp jaws 506 and 508 mounted on pivotal arms 510. The arms 510,510 normally are urged towards each other by a spring 515, FIGS. 38 and 44.

Before the blanks are transferred from the positioning and transferring assembly 14 to the pantyhose seaming machine 16, a clamping assembly 502 must be properly aligned with a clamp control assembly 512, FIG. 38. The pivotal arms 510 must be in the closed position of FIGS. 38 and 39 such that the clamp jaws 506,508 of each pair of jaws are parallel and adjacent each other to receive the shells 376,376 thereover. At this time the upper and lower jaws 506 and 508 of each pair of clamp jaws are open for receiving therebetween a band end portion W of a blank.

Once the shells having blanks thereon are driven forward at station E, a microswitch 520, FIG. 37, senses the moving carriage 442 and through the microprocessor MP stops the carriage drive motor 440.

Mounted adjacent the extended shells 376 at station E is a blank transfer and leg separation assembly 528, FIGS. 39-41. The assembly 528 includes a carriage 532 mounted for displacement along support rails 534 by a fluid cylinder 536. Supported upon the carriage 532 are a pair of laterally spaced gripper and leg positioning robots 530 for assisting in transferring the blanks from the shells 376 to a clamping assembly 502 of the machine 16.

Each gripper and leg positioning robot 531 includes an arm 540 pivotably mounted upon a pin 542 supported upon carriage 532, a unit 544 attached to the outer end of arm 540 for rotatably supporting a fluid conduit section 546, and a clamp 548 for engaging a blank positioned on one of the shells 376. The robot 530 also includes an elongated, rigid member 550, FIG. 41, having one end attached to the carriage 532 by a fastening means 552 and the opposite end connected to an upstanding portion 545 of the conduit 546 by a conventional fastener 554. The opposed arms 540, FIG. 41, are pivotably connected to a double acting fluid cylinder 522. The arms 540 are normally positioned as shown in FIG. 41 with the clamps 548 and conduit sections 546 positioned outwardly and downwardly away from the blanks and shells 376. Upon actuation of the cylinder 522 the upper ends of the arms 540 are moved towards each other from the FIG. 41 positions to the FIG. 39 positions with clamps 548 and the end portions of the conduit sections 546 positioned in engagement with the blanks extending over the side portions of the shells 376,376. Since the conduit section 546 is rotatably mounted within unit 544 and the upstanding portion 545 of the conduit section 546 is attached to member 550, the conduit sections rotate to the FIG. 39 positions upon movement of the arm 540 towards each other by the fluid cylinder 522.

Note that one clamp pad 548 engages the shell 376 of loading frame 280 while the other clamp pad engages the shell of loading frame 282. The same is true for the end portions of the conduit sections 546. Thus the blank on a particular shell will have one portion engaged by clamp pad 548 and the opposed portion positioned adjacent the end portion of a conduit section 546.

The positioning and transferring assembly 14 also includes a clamping assembly 560, FIG. 39, supported by the generally horizontally extending stationary support shaft 562 which extends throughout the assembly 14 and about which the turret assembly 290 rotates. The clamping assembly includes a stationary plate 564 having secured thereto two vertically disposed fluid cylinders 566,566. The rods of the two cylinders extend through openings in plate 564 and are connected to a horizontally disposed plate or clamp member 568 which is adapted to be displaced downwardly from the position of FIG. 39 to engage the clamp jaws 506 of the GLC clamping assembly 502 located at station I, FIG. 43. At station I, the clamp jaws 506,508 are normally open for receiving therebetween the adjacent portions of the blanks extending around the shells 376,376. As shown by FIG. 42 the lower jaw 508 is fixed while the upper jaw 506 is displaceable between an open position by a spring 570 and a closed position by an electrical actuator 572 and an electromagnet 574 as disclosed, for example, in U.S. Pat. No. 4,188,898. When the electromagnet 574 is activated, it overcomes the force exerted upwardly by the coil spring 570 and pulls the jaw 506 downwardly.

Upon actuation of the cylinders 566,566, the plate 568 moves downwardly forcing clamp jaws 506 towards jaws 508 to grip adjacent portions of the blanks therebetween.

In operation, when the carriage 380 moves forward to extend the shells 376,376 in overlapping relation with the clamp jaws 506,508, as shown by FIG. 39, the microswitch 520 detects the carriage 380 and through the microprocessor deactivates motor 440 and substantially simultaneously activates the two fluid cylinders 566,566 to move the clamp plate 568 downwardly and also activates fluid cylinder 522, FIG. 41, to pivot the clamping assemblies 560,560 from the FIG. 41 positions to the FIG. 39 positions with the pads 548,548 in clamping relation with the blanks on the loading frame shells 376,376. The microprocessor then activates the fluid cylinder 536 to drive the blank transfer and leg separation assembly 538 forward to positions where the end portions of the conduit sections 546 are located at about the midpoint of the shells 376.

As the transfer and leg separation assembly 528 moves forward, a sensor 580, FIG. 40, detects the presence of the carriage 532, and through the microprocessor MP, a signal is directed to the motor 440 to retract the carriage 442 and shells 376 to the FIG. 37 position. The blanks B are clamped between jaws 506,508 and as the shells 376,376 retract, the toe end portions E of the blanks are held by suction in the ends of the conduit sections 546. The microprocessor also reverses the fluid cylinder 536 to retract the assembly 528, and when the carriage 532 is no longer detected by sensor 580 the fluid cylinder 522 is reversed to open the arms 540,540 and swing them and the conduit sections 546,546 from the FIG. 39 position to the FIG. 41 position. The blank band portions of the blanks are held by the clamp jaws 506,508 and upon rearward movement and rotation of the conduit sections 546,546 the leg portions of the blanks are separated and pulled over guides 584 secured to the outer guide rail 586 of the GLC machine 16, FIG. 44. When the carriage 532 retracts and is detected by sensor 588, the fluid flow in the conduit sections 546 is reversed to blow the blank leg portions from the ends of the conduit sections. The sensor 588, through the microprocessor, activates the drive motor 580, FIGS. 43 and 49, of the machine 16 to index the turntable 592 from station I to station II.

The turntable 504 is provided with a rack 505 which meshes with a gear 591 to index the turntable from station to station. The turntable is displaceable along support surface 503. Rack sections 509 and 511 are selectively spaced on the support surface and serve to open and close the pivotable arms 510,510 having the clamp jaws 506,508 supported thereon. The indexing of the turntable and the pivoting of the arms 510,510 operates in the same manner as disclosed in U.S. Pat. No. 4,188,898.

Prior to the indexing of a clamping assembly 502 of the GLC machine 16 from station VII to Station I, FIG. 43, and prior to extension forward of the sleeves 376,376 at station E, certain conditions must be satisfied. Referring initially to FIGS. 38 and 42, as a clamping assembly 502 is being indexed from station VII towards station I, bearing rollers 600 enter a guide rail assembly 602 which serves to open to a greater extent the jaws 506,508 of the clamp assembly 502. Each bearing roller 600 is supported by a plate 604 which, in turn, is secured to spaced guide rods 606,606 which slidably extend through housing 608 and have their upper end portions secured to the displaceable clamp jaw 506.

The guide rail assembly 602 includes spaced, generally parallel rails 610,612 having ramp portions 614,616 for assisting in directing the bearing roller therebetween. The spacing between the rails is substantially equal to the diameter of roller 600. The ramp 616 and the elevation of the rail 612 above the turntable 592 serves to slightly elevate the bearing roller 600 which raises the plate 604 and upper clamp jaw 506 to increase slightly the space between the clamp jaws 506,508.

The rails 610,612 are secured together and are capable of being selectively displaced vertically by a fluid cylinder 620 mounted upon a fixed support structure 618 positioned inwardly of the turntable 592. The cylinder rod is coupled to a frame section 622 which has rails 610,612 secured thereto and which is slidably displaceable along vertical guide rods 624, FIG. 38. When the bearing rollers 600 enter between the rails 610,612 the fluid cylinder 620 has the rails in the raised position.

Positioned on the top rail 610 are two photocells 630,632. When the clamp assembly 602 at station VII is indexed to station I and is properly positioned the photocells 630,632 detect the bearing rollers 600,600.

Referring to FIG. 44, once the drive motor 590 has been activated, by the sensor 588 and microprocessor MP, to initiate the indexing of the turntable 592 from station I towards station II. A scissors assembly 650 advances its cutter blades 652 from the FIG. 44 position to the FIG. 45 position with the blades severing the intermediate adjacent portions of the blanks extending between the horizontally spaced clamp jaws. The operation of the cutter assembly is the same as disclosed in U.S. Pat. Nos. 3,777,681; 4,188,898; and 4,188,897.

Positioned upon arm 654 above and secured to the scissors assembly 650 is a photocell 656. As the blades 652 advance from the FIG. 44 position to the FIG. 45 position the photocell 656 detects the band of the uppermost blank and through the microprocessor MP actuates fluid cylinder 620 to urge the guide rail assembly 602 downwardly thus tightly gripping the blank fabric between the jaws 506,508. Further indexing of the turret causes the gearing, FIG. 49 to engage the racks 509,511 for initiating swinging of the arms 510,510 and spreading of the clamped band end portions of the blanks as shown by FIG. 46. The arms 510,510 continue to open to the FIG. 47 position.

Fixedly positioned with respect to turntable 592 and the swingable scissors assembly 650 are spaced sensors 680 and 682, FIG. 38. As the scissors assembly swings to the left, FIGS. 44 and 38, a boldhead 684 is detected by the sensor 680 which activates the motor 292 to index the turret assembly 290 to position another pair of shells 376,376 having blanks thereon at station E. When the leftmost open arm 510 is moved past sensor 682, through the microprocessor the fluid cylinder 620 is activated to move the guide rail assembly 602 upwardly.

When the blanks are indexed to station II, FIG. 48, an assembly 690, FIG. 48, is provided to sense for the presence of the blank leg portions overhanging the rail 586.

The assembly 690 includes fixed frame 692 having guides 694 for slidably receiving therein guide rods 696. The guide rods form a part of a frame 698 having two spaced cup sections 700 thereon and having the lower portions thereof connected to a flexible vacuum hose 702. The frame 698 and cups 700,700 are displaced vertically upwardly by a fluid cylinder 704. Sensors 706 are provided in the cups 700 to detect the pressure therein of the toe end portions of the blanks. The actuation of the cylinder 704 is controlled by the microprocessor MP upon the blanks being indexed to station II. If a blank is not detected by a sensor in each cup 700, the microprocessor will prevent further indexing of the turntable 504.

Assuming that blanks have been sensed in the cups 700, the turret is sequentially indexed to stations III, IV, V and VI where gusset pieces are inserted by a gusset positioning assembly 702, FIG. 43, and the gusset and severed portions of the blanks are sewn together by sewing machines 722 and 724 in a conventional manner, as disclosed, for example, by U.S. Pat. No. 4,267,785.

Once the sewn blanks defining the body portion of a pantyhose garment reach station VII, the garment may be transferred in a conventional manner to the toe closer machine 18, as disclosed in U.S. Pat. No. 4,620,494, where the toe portions of the blanks are closed by a sewing machine 730 and the completed pantyhose garments doffed therefrom.

The specific microprocessor control means for the various functions are known and form no part of the present invention apart from defining an operative system and presenting a complete disclosure.

While specific embodiments of the invention have been shown and described in detail to illustrate the application of the invention principles, it is to be understood that the invention may be embodied otherwise without departing from the principles of the invention.

What is claimed is:

1. Apparatus for the automatic formation of pantyhose having panty, leg and foot portions from pairs of individual tubular hosiery blanks, each of which has a band portion and a toe portion, first machine means for forming the panty portion from the band portions of each such pair of hosiery blanks, second machine means for closing the toe portions of the tubular hosiery blanks, means for transferring the tubular hosiery blanks from said first machine to said second machine, supply means having a plurality of randomly positioned tubular hosiery blanks therein, and means for automatically sequentially randomly retrieving said tubular hosiery blanks from said supply means, orienting each blank in a prescribed manner and positioning the blanks on said first machine.

2. Apparatus as recited in claim 1, said means for sequentially removing said tubular hosiery blanks from said supply means, orienting each blank in a prescribed manner and positioning the blanks on said first machine including a first assembly means for positioning pairs of said hosiery blanks in aligned relationship and expanding open the band portions of the aligned hosiery blanks.

3. Apparatus as recited in claim 2, said means for sequentially removing said tubular hosiery blanks from said supply means, orienting each blank in a prescribed manner and positioning the blanks on said first machine including a second assembly means for aligning, orienting and removing pleats from said pair of blanks prior to positioning said pair of blanks on said first machine means.

4. Apparatus as recited in claim 3, said means for sequentially removing said tubular hosiery blanks from said supply means, orienting each blank in a prescribed manner and positioning said blanks on said first machine means further including a loading assembly for transferring pairs of aligned blanks from said first assembly means to said second assembly means.

5. Apparatus as recited in claim 3, said second assembly means including a turret assembly including a plurality of pairs of loading frames for receiving pairs of hosiery blanks from said first assembly means.

6. Apparatus as recited in claim 5, said second assembly means further including means for selectively positioning the band and toe portions of the blanks on said pairs of loading frames.

7. Apparatus as recited in claim 5, said second assembly means further including means for removing pleats and creases from hosiery blanks positioned on said loading frames.

8. Apparatus as recited in claim 7, wherein each loading frame includes a first support and a displaceable second section, displaceable rod means including a pair of parallel rods secured to a pair of levers, pivot means supporting said pair of levers for rotation, means for conveying said displaceable second section having a blank thereon in overlapping relation with said pair of parallel rods, and drive means for rotating said pair of levers and said rods secured thereto about said pivot means and intermediate said displaceable second section and said tubular blank positioned thereon to remove pleats wrinkles therefrom.

9. Apparatus as recited in claim 5, said second assembly means further including a transfer and leg portions separation assembly for conveying a pair of hosiery blanks from said loading frames to said first machine means.

10. In an apparatus for automatically producing pantyhose garments from tubular hosiery blanks, each such blank having a welt end and a toe end, supply means having a plurality of randomly positioned tubular hosiery blanks therein, a positioning and transferring assembly, means for sequentially randomly retrieving said hosiery blanks from said supply means and orienting said hosiery blanks in a specified manner, means conveying said hosiery blanks oriented in said specified manner to said positioning and transferring assembly, said positioning and transferring assembly including means for aligning pairs of said hosiery blanks, and removing pleats therefrom, pantyhose seaming machine means, means for transferring said hosiery blanks from said positioning and transferring assembly to said pantyhose seaming machine means, where pairs of said hosiery blanks are slit and sewn together to define the body portion of a pantyhose garment, toe closure means for sewing closed said hosiery blanks, means for transferring said sewn blanks to said toe closing machine.

11. Apparatus as recited in claim 10, said pantyhose seaming machine means including a plurality of clamping assemblies supported on a turntable for displacement to sewing instrumentalities, each clamping assembly including pairs of upper and lower elongated clamp jaws, said means for transferring said hosiery blanks from said positioning and transferring assembly to said pantyhose seaming machine means including means for selectively positively opening said pairs of upper and lower clamp jaws of a clamping assembly for facilitating the receiving of the welt ends of blanks therebetween, and means for selectively positively closing said pairs of upper and lower clamp jaws.

12. Apparatus as recited in claim 10, said pantyhose seaming machines further including means for sensing the presence of the blank toe ends prior to the sewing together of hosiery blanks held by said upper and lower clamp jaws.

13. In an apparatus for forming pantyhose garments from tubular hosiery blanks, each such blank having a welt end and a toe end, first means for sequentially randomly retrieving hosiery blanks from a supply source and orienting said hosiery blanks in a specified manner at a first location, pantyhose seaming machine means, a hosiery blank positioning and transferring assembly, means for conveying said hosiery blanks from said first location to said positioning and transferring assembly, said positioning and transferring means including a rotatable turret having a plurality of pairs of loading frames for receiving said hosiery blanks thereon, said positioning and transferring means including means for selectively positioning said hosiery blanks on said loading frames and means for transferring said hosiery blanks from said loading frames to said pantyhose seaming machine means.

14. In an apparatus for forming pantyhose garments from tubular hosiery blanks as recited in claim 13, said positioning and transferring means further including means for removing pleats from hosiery blanks positioned on said plurality of pairs of loading frames.

15. In an apparatus as recited in claim 14, said means for removing pleats including elongated members displaceable between said hosiery blanks and said loading frames.

16. In an apparatus as recited in claim 13, said means for selectively positioning said hosiery blanks on said loading frames including a gripper robot assembly for gripping and slidably selectively positioning selected portions of said hosiery blanks on said loading frames and a positioning roller assembly for selectively displacing the toe ends of said hosiery blanks relative to said loading frames.

17. The method of forming pantyhose having panty, leg and foot portions from pairs of individual tubular hosiery blanks, each of which has a band portion and a toe portion comprising the steps of: retrieving sequentially tubular hosiery blanks from a supply of randomly oriented hosiery blanks; conveying the blanks to a receiving station; sensing the orientation of each blanks as it is being conveyed; orienting the blanks in a prescribed manner prior to the blanks reaching the receiving station; discharging simultaneously a pair of blanks oriented in the prescribed manner from the receiving station; conveying the pair of blanks to a first work station; forming the panty portion of a pantyhose garment from the band portions of the pair of blanks; conveying the pair of blanks defining the panty portion to a second work station; and closing the toe portions of the pair of blanks defining the panty portion.

18. The method of forming pantyhose having body, leg and toe portions from pairs of individual tubular hosiery blanks comprising the steps of: removing randomly positioned tubular hosiery blanks sequentially from a supply source; sensing the orientation of the hosiery blanks and conveying them in a predetermined manner to predetermined locations, positioning a pair of hosiery blanks in a prescribed, aligned relationship at the predetermined locations; conveying simultaneously the aligned pair of hosiery blanks to a work station; severing selected portions of the aligned pair of tubular hosiery blanks and sewing selected portions of the pair of hosiery blanks to define the body portion of a pantyhose garment.

19. The method as recited in claim 18, and further including the step of presenting a gusset to the severed selected portions of the pair of hosiery blanks, and sewing the pair of hosiery blanks and the gusset to define the body portion.

20. The method as recited in claim 18, wherein the step of conveying simultaneously the aligned pair of hosiery blanks to a work station includes removing pleats therefrom.

* * * * *